(12) United States Patent
Wang et al.

(10) Patent No.: US 11,838,766 B2
(45) Date of Patent: Dec. 5, 2023

(54) FACILITATING IMPLEMENTATION OF COMMUNICATION NETWORK DEPLOYMENT THROUGH NETWORK PLANNING IN ADVANCED NETWORKS

(71) Applicant: AT&T INTELLECTUAL PROPERTY I, L.P., Atlanta, GA (US)

(72) Inventors: Huahui Wang, Bridgewater, NJ (US); Wenjie Zhao, Princeton, NJ (US); Ravi Raina, Skillman, NJ (US); Tony Thayil, Fairfax, VA (US); Gopalakrishnan Meempat, East Brunswick, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 386 days.

(21) Appl. No.: 17/314,936

(22) Filed: May 7, 2021

(65) Prior Publication Data
US 2022/0369118 A1    Nov. 17, 2022

(51) Int. Cl.
*H04W 16/18* (2009.01)
(52) U.S. Cl.
CPC .................................. *H04W 16/18* (2013.01)
(58) Field of Classification Search
CPC . H04L 41/0853; H04L 41/5051; H04L 47/70; H04L 41/04; H04L 41/0806; H04L 43/0817; H04L 41/40; H04W 16/10; H04W 16/18; H04W 24/02; G06N 5/048; G06F 11/079
See application file for complete search history.

(56) References Cited

U.S. PATENT DOCUMENTS 10,064,099 B1   8/2018  Raina et al.
10,484,918 B2   11/2019 Wang et al.

OTHER PUBLICATIONS

Wang et al., "Apparatuses and Methods to Facilitate Load-Aware Radio Access Network Resource Allocations" U.S. Appl. No. 16/868,599, filed May 7, 2020. 61 pages.
Meempat et al., "Apparatuses and Methods for Network Resource Dimensioning in Accordance With Differentiated Quality of Service" U.S. Appl. No. 16/868,718, filed May 7, 2020. 62 pages.

*Primary Examiner* — Jung Liu
(74) *Attorney, Agent, or Firm* — Amin, Turocy & Watson, LLP

(57) ABSTRACT

Facilitating implementation of communication network deployment through network planning in advanced networks (e.g., 5G, 6G, and beyond) is provided herein. Operations of a system can include, configuring a first deployment scenario for first network equipment and a second deployment scenario for second network equipment. The first deployment scenario is selected from a group of first deployment scenarios and can include a first parameter. The second deployment scenario is selected from a group of second deployment scenarios and can include a second parameter. The configuring can include determining that a sum of the first parameter and the second parameter satisfies a function of a defined parameter level. The operations also can include facilitating a first enactment of the first deployment scenario for the first network equipment and a second enactment of the second deployment scenario for the second network equipment.

20 Claims, 10 Drawing Sheets

FACILITATING IMPLEMENTATION OF COMMUNICATION NETWORK DEPLOYMENT THROUGH NETWORK PLANNING IN ADVANCED NETWORKS

TECHNICAL FIELD

This disclosure relates generally to the field of network communication planning and, more specifically, to implementation of communication network deployment through network planning in wireless communication systems for advanced networks (e.g., Fifth Generation (5G), Sixth Generation (6G), and beyond).

BACKGROUND

The use of computing devices is ubiquitous. Given the explosive demand placed upon mobility networks and the advent of advanced use cases (e.g., streaming, gaming, and so on), radio access network capacity and/or coverage needs should be addressed, such as through the placement of new resources (e.g., nodes) within the network. How to plan and place such nodes optimally is a challenging problem in view of limited resources and costs, rising demands, and so on. Accordingly, unique challenges exist related to analysis and placement of such resources and in view of 5G, 6G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
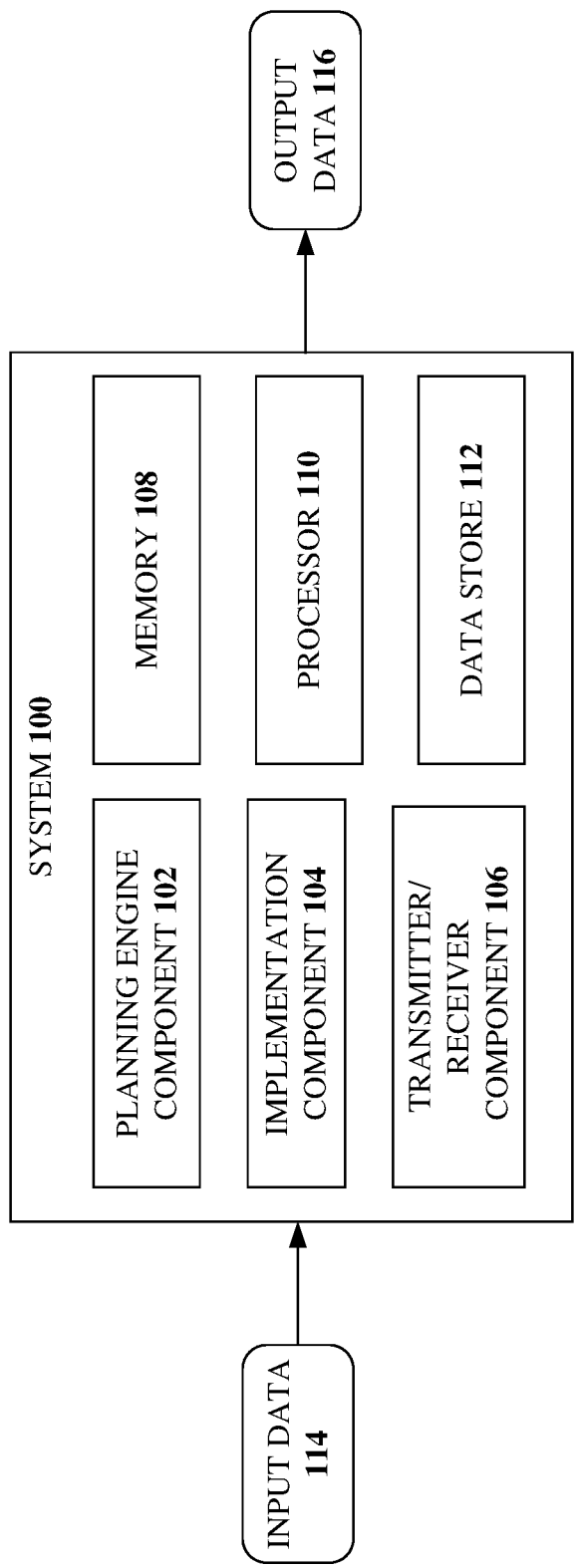
FIG. 1 illustrates an example, non-limiting, system that facilitates implementation of communication network deployment through network planning in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate implementation of communication network deployment through network planning in advanced networks. The increased use of communication devices and the demand for faster communication speeds, support of ever expanding applications and related services, the increase in the amount of communication devices, and other expectations, has led to more investment in communication networks to meet the ever rising demands and expectations. In some cases, users of the communication devices (e.g., User Equipment (UE)) might use download and upload speed test results to rank the various network operators and decide which network to use for their personal UEs. Combined with this is the promotion of unlimited data plans, which can significantly grow the communication traffic in the network. Accordingly, network operators continue to invest in their networks to improve the user performance. How to invest intelligently to obtain the best return is a concern and, if answered correctly, can have a significant, positive impact on the user performance.

For example, there are multiple options to choose from when investing in a network, each option having different costs and different performance improvements. For example, an option can be to upgrade the hardware and/or software of the existing network (e.g., network equipment) to make the network equipment more efficient (e.g., replace cells of 2-branch antennas with 4-branch antennas to take advantage of Multiple-Input Multiple-Output (MIMO) gains). Another option can be to add new carriers and/or spectrum, or split sectors to increase the capacity of the network. Still another option can be network densification, which can be achieved by adding small cells or new macro sites to reuse the spectrum. Yet another option can be to add new radios (e.g., 5G, 6G, and beyond) on top of (e.g., in addition to) existing Long Term Evolution (LTE) and/or other older technologies. One or more of these options and/or other options can be implemented to upgrade the network and improve network performance.

Network upgrade is generally limited by one or more constraints, such as budget constraints. Thus, decisions have to be made related to which options to implement in order to maximize the overall network performance, as well as the investment return, and where the upgrade should take place within the network. The challenge is that there are a lot of dependencies among the improved performance, the investment return, and the cost of each option. The various embodiments discussed herein provide a modularized optimization system to simplify these intricate relations and solve the problem related to network planning and deployment. In this regard for the avoidance of doubt, any embodiments described herein in the context of optimizing network performance (and/or performing other optimization) are not so limited and should be considered also to cover any techniques that implement underlying aspects or parts of the described aspects to improve or increase network performance, even if resulting in a sub-optimal variant obtained by relaxing aspects or parts of a given implementation or embodiment.

The conventional methods of augmenting a network is based on engineering experience, assisted by continuous monitoring of the network defined performance metrics and/or performance indicators (e.g., key performance indicators (KPIs)). For example, an alarm may be triggered when a site undergoes poor KPIs, such as if the average UE throughput is below a certain level for a certain period of time, for example. A decision would be made to either upgrade the hardware and/or the software, or to add a new carrier (if the spectrum is available), or to use some other approach, such as cell splitting, adding small cells, and so forth. Such conventional methods are more focused on short-term gains, and generally lack a holistic view of the overall network optimization, which is provided with the embodiments discussed herein. An example of a holistic approach is determining that it might not be beneficial to upgrade some sites if the carried traffic is low, and so on. For example, if there are a number of sites under consideration and a budget is limited, the one or more embodiments provided herein can determine where, within the network, upgrades should first occur and how to upgrade the network such that the overall gain is maximized without exceeding budget constraints. In some cases, as discussed herein, an update to a site is not implemented, while updates to other sites are implemented.

In one embodiment, described herein is a method that includes facilitating, by a device including a processor, receiving first input data associated with first network equipment and second input data associated with second network equipment. The first input data can include first alternative deployment conditions and respective first criteria of the first alternative deployment conditions for the first network equipment. The second input data can include second alternative deployment conditions and respective second criteria of the second alternative deployment conditions for the second network equipment. The method also includes determining, by the device, a first deployment condition for the first network equipment and a second deployment condition for the second network equipment. The first deployment condition is selected from the first alternative deployment conditions and the second deployment condition is selected from the second alternative deployment conditions. Additionally, a first criterion of the respective first criteria is defined for the first deployment condition and a second criterion of the respective second criteria is defined for the second deployment condition. An aggregation of the first criterion and the second criterion satisfies a function that indicates at least a defined criterion. Further, the method includes facilitating, by the device, a first implementation of the first deployment condition for the first network equipment and a second implementation of the second deployment condition for the second network equipment.

According to some implementations, facilitating of the first implementation of the first deployment condition can include deploying third network equipment for use with the first network equipment. In some implementations, facilitating of the first implementation of the first deployment condition can include deploying small cells for use with the first network equipment. In accordance with some implementations, facilitating of the first implementation of the first deployment condition can include deploying carrier additions for use with the first network equipment.

The first deployment condition can include no changes to the first network equipment. Further to this implementation, facilitating of the first implementation of the first deployment condition can include taking no action.

In an example, determining the first deployment conditions and the second deployment conditions can include modeling traffic distribution. Modeling of the traffic distribution can be based on execution of the first alternative deployment conditions and the second alternative deployment conditions and based on detection of a change in network capacity. Further, the modeling can include utilizing a modular approach for the modeling.

In another example, determining the first deployment conditions and the second deployment conditions can include modeling user performance based on execution of the first alternative deployment conditions and the second alternative deployment conditions and based on a detection of a network traffic change.

According to another example, determining the first deployment conditions and the second deployment conditions can include modeling based on execution of the first alternative deployment conditions and the second alternative deployment conditions and based on a change in network capacity or network traffic. The modeling can include utilizing a modular approach and selecting the first deployment condition and the second deployment condition that are determined to retain associated costs below a threshold cost level.

According to some implementations, the method can include, prior to the determining, defining, by the device, the first alternative deployment conditions for the first network equipment and the second alternative deployment conditions for the second network equipment based on reported quality of experience of user equipment within a geographic area.

In some implementations, the first input data can include first upgrade options for the first network equipment, respective first parameters for the first upgrade options, and a defined threshold for a combination of the respective first parameters and respective second parameters of the second network equipment. Additionally, the second input data can include second upgrade options for the second network equipment, respective second parameters for the second upgrade options, and the defined threshold. Further to these implementations, the respective first parameters can include first financial data, the respective second parameters can include second financial data, and the defined threshold can include a financial budget limit.

Another embodiment relates to a system that can include a processor and a memory that stores executable instructions that, when executed by the processor, facilitate performance of operations. The operations can include, configuring a first deployment scenario for first network equipment and a second deployment scenario for second network equipment. The first deployment scenario is selected from a group of first deployment scenarios and can include a first parameter. The second deployment scenario is selected from a group of second deployment scenarios and can include a second parameter. The configuring can include determining that a sum of the first parameter and the second parameter satisfies a function of a defined parameter level. The operations also can include facilitating a first enactment of the first deployment scenario for the first network equipment and a second enactment of the second deployment scenario for the second network equipment.

In some implementations, facilitating of the first enactment of the first deployment scenario can include performing an action of a group of actions. The group of actions can include: deploying third network equipment for use with the first network equipment, deploying small cells for use with the first network equipment, deploying carrier additions for use with the first network equipment, and performing no activity with respect to the first network equipment.

In some implementations, facilitating of the second enactment of the second deployment scenario can include performing an action of a group of actions. The group of actions can include deploying third network equipment for use with the second network equipment, deploying small cells for use with the second network equipment, deploying carrier additions for use with the second network equipment, and making no changes to the second network equipment.

The operations can include, according to some implementations, prior to the configuring, defining the group of first deployment scenarios for the first network equipment based on first reported quality of experience of first user equipment within a first geographic area of the first network equipment. Further to these implementations, the operations can include defining the group of second deployment scenarios for the second network equipment based on second reported quality of experience of second user equipment within a second geographic area of the second network equipment.

The operations can include, in some implementations, prior to the configuring, receiving first input data for the first network equipment and second input data for the second network equipment. The first input data can include first upgrade options for the first network equipment and respective first totals for the first upgrade options. Further to these implementations, the second input data can include second upgrade options for the second network equipment and respective second totals for the second upgrade options.

A further embodiment relates to a non-transitory machine-readable medium, including executable instructions that, when executed by a processor, facilitate performance of operations. The operations can include determining, based on first input data, a first deployment state for first network equipment and, based on second input data, a second deployment state for second network equipment. The first input data can include a first indication of a first parameter and the second input data can include a second indication of a second parameter. Additionally, the determining can include determining that a combination of the first parameter and the second parameter does not exceed a defined parameter setting. The operations also can include facilitating a first action associated with the first network equipment based on the first deployment state and a second action associated with the second network equipment based on the second deployment state.

In an example, the first action can include an action selected from a group of actions. The group of actions can include deploying third network equipment for use with the first network equipment, deploying small cells for use with the first network equipment, and deploying carrier additions for use with the first network equipment. Alternatively, the first deployment state indicates that no changes are to be implemented at the first network equipment, and the first action can include taking no action.

Referring initially to FIG. 1, illustrated is an example, non-limiting, system 100 that facilitates implementation of communication network deployment through network planning in accordance with one or more embodiments described herein. In this regard for the avoidance of doubt, any embodiments described herein in the context of optimizing implementation of communication network deployment are not so limited and should be considered also to cover any techniques that implement underlying aspects or parts of the described aspects to improve or increase implementation of communication network deployment, even if resulting in a sub-optimal variant obtained by relaxing aspects or parts of a given implementation or embodiment.

Aspects of systems (e.g., the system 100 and the like), apparatuses, and/or processes (e.g., computer-implemented methods) explained in this disclosure can include machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described. In various embodiments, the system 100 can be any type of component, machine, device, facility, apparatus, and/or instrument that can include a processor and/or can be capable of effective and/or operative communication with a wired and/or wireless network.

The system 100 can include a planning engine component 102, an implementation component 104, a transmitter/receiver component 106, at least one memory 108, at least one processor 110, and at least one data store 112. In various embodiments, one or more of the planning engine component 102, the implementation component 104, the transmitter/receiver component 106, the at least one memory 108, the at least one processor 110, and the at least one data store 112 can be electrically and/or communicatively coupled to one another to perform one or more of the functions of the system 100. In some embodiments, one or more of the planning engine component 102, the implementation component 104, and the transmitter/receiver component 106 include software instructions stored on the at least one memory 108 and/or the at least one data store 112 and executed by the at least one processor 110. The system 100 may also interact with other hardware and/or software components not depicted in FIG. 1.

The planning engine component 102 can receive input data 114 (e.g., via the transmitter/receiver component 106). The input data 114 can include information related to upgrade options for various nodes (e.g., network equipment) and totals related to the upgrade options. The totals can be related to costs for implementing the upgrade options. In addition, the input data 114 can include a defined threshold which can relate to a total budget amount (e.g., a budget limit, a defined parameter setting) for implementing upgrades to various network equipment within the defined network. Accordingly, one or more actions can be taken with respect to network equipment provided that respective parameters (e.g., costs) defined for the one or more actions does not exceed the defined parameter setting (e.g., a total budget amount).

For example, for first network equipment, one or more upgrade options can be received as the input data 114. Further, respective costs can be associated with the one or more upgrade options. Thus, input data 114 for the first network equipment can include a first upgrade option and associated first total cost for implementing the first upgrade option at the first network equipment, a second upgrade option and associated second total cost for implementing the second upgrade option at the first network equipment, a third upgrade option and associated third total cost for implementing the third upgrade option at the first network equipment, and so on. It is noted that although discussed with respect to three upgrade options, any number of upgrade options can be associated with the network equipment.

The input data 114 for the other network equipment can include similar information. For example, input data 114 for second network equipment can include a first upgrade option and associated first total cost for implementing a first upgrade option at the second network equipment, which can be the same as the first upgrade option implemented for the first network equipment or a different upgrade option. Further, the input data can include a second upgrade option and associated second total cost for implementing the second upgrade option at the second network equipment, which can be the same or different than the second upgrade option implemented at the first network equipment. The input data 114 can also include a third upgrade option and associated third total cost for implementing the third upgrade option at the second network equipment, which can be the same, or different than, the third upgrade option implemented at the first network equipment, and so on. It is noted that although discussed with respect to three upgrade options, any number of upgrade options can be associated with the network equipment.

Based on the input data 114, the planning engine component 102 can configure a first deployment state or first deployment scenario for first network equipment, a second deployment state or second deployment scenario for second network equipment, a third deployment state or third deployment scenario for third network equipment, and so on. The various deployment scenarios can be output as output data 116, which can be deployed by the implementation component 104. Further, the output data 116 can include a rank ordering of the sites and the options. The rank ordering can indicate which sites and associated options should be implemented prior to other sites and associated options.

Thus, the implementation component 104 can facilitate execution of the first deployment scenario at the first network equipment by taking a first action, the second deployment scenario at the second network equipment by taking a second action, the third deployment scenario at the third network equipment by taking a third action, and so on. The output data can include the recommended option for each site and related cost and performance information. The output data can also include overall performance information. In an example, the output data can include a first indication of a first parameter (e.g., a first deployment state) for the first network equipment, a second indication of a second parameter (e.g., a second deployment state) for the second network equipment, and subsequent indications of subsequent parameters (e.g., subsequent deployment states) for subsequent network equipment (e.g., third network equipment, fourth network equipment, fifth network equipment, and so on).

In further detail, the output data 116 can be determined, at least in part, based on maximizing a return of investment (ROI). For example, the output data 116 can be associated with capital optimization that has a goal of maximizing the ROI across a geographic area by choosing optimal hardware and/or software upgrading options on selected sites, without exceeding the budget limit. In other words, the one or more embodiments can optimally utilize the limited budget to obtain the best ROI possible. The ROI can be related to one or more of revenue growth, reduced churn, improvement of user experience, and/or other benefits. Further, the area can be one or more markets, one or more defined geographic areas, one or more cities, one or more states, across an entire nation, and so on.

The ROI can be correlated with the quality of user experience, such as a quality of experience (QoE) and/or quality of service (QoS). In some implementations, the ROI can also be correlated with the number of UEs in the area (e.g., the more UEs, the larger the impact). In some embodiments, it can be assumed that a function f( ) reveals the relation between the ROI and the QoE (e.g., ROI=f(QoE)). Depending on the optimization objective, in the special case when f( ) is defined as a simple pass-through function, ROI=QoE.

The output data 116 can include one or more upgrading options. Thus, the output data can include, but is not limited to, the following: (1) improving the antenna systems to enhance capacity; (2) adding new carriers if additional spectrum is available; (3) sectorizing cells to expand capacity; (4) adding small cells or new sites to offload traffic, (5) adding new radios using 5G, 6G, other advanced or next generation technologies, and so on. These upgrades can directly impact the QoE, and then the ROI.

In further detail, for a geographical area with a total of N sites (where N is an integer), the deployed cells and/or deployed carriers for each site are known, together with their respective performance metrics and/or respective performance indicators (or KPIs). For example, the performance indicators can include, but are not limited to cell capacity, carried traffic, resource utilization, UE throughput, and so on.

Denote the number of "installed" carriers for sector and/or face k on site n as $I_{n,k}$, the number of potentially new carriers in the same sector as $J_{n,k}$, the traffic for each carrier i as $D_{n,k,i}$, the cost of upgrading an existing carrier i as $M_{n,k,i}$, and the cost of adding a new carrier j as $M_{n,k,j}$. Let $x_{n,k,i}$ and $x_{n,k,j}$ be the binary variable indicating whether upgrade or addition is performed on cell i and j. The objective is to maximize the overall UE QoE under the total budget limit of M, which is formulated as follows:

$$\text{Max}(f(\text{QoE})), s.t. \Sigma_{n,k}\Sigma_i^{I_{n,k}} M_{n,k,i} \cdot x_{n,k,i} + \Sigma_{n,k}\Sigma_j^{J_{n,k}} M_{n,k,j} \cdot x_{n,k,j} \leq M$$

$$s.t. \Sigma_i^{I_{n,k}} D_{n,k,i} + \Sigma_j^{J_{n,k}} D_{n,k,j} = D_{n,k}, \qquad \text{Equation 1.}$$

If the overall performance being optimized is the harmonic mean UE throughput, then $$QoE = \left(\sum_{n,k}\sum_i^{I_{n,k}} D_{n,k,i} + \sum_{n,k}\sum_j^{J_{n,k}} D_{n,k,j}\right) \Big/ \left(\sum_{n,k}\sum_i^{I_{n,k}} \frac{D_{n,k,i}}{T_{n,k,i}} + \sum_{n,k}\sum_j^{J_{n,k}} \frac{D_{n,k,j}}{T_{n,k,j}}\right). \qquad \text{Equation 2}$$

The planning engine component 102 can be realized as components of a modular system. Further, the problem (and equations) discussed above, can be decoupled and solved using the modular system as discussed herein.

A challenge of the formulated problem is that the traffic distribution $D_{n,k,i}$, capacity $T_{n,k,i}$, and the overall QoE are all functions of $x_{n,k,i}$ (although not explicitly expressed in the formula). This makes the entire problem highly non-linear, and difficult, if not impossible, to solve.

To address the above noted challenge and derive a tractable solution, the one or more embodiments provided herein include different modules and associated functions (e.g., the planning engine component 102) that are configured to decouple the relations of different terms in the formula.

The modules can calculate the QoE under all available options in parallel and prepare the inputs to an optimizer (e.g., the planning engine component 102). In an example, the modules can evaluate the data one by one (e.g., one site and one option) and under different options (e.g., a first site with a first option, a second site with a second option, and also a third site with a third option, and so on). The results of the evaluation can be communicated to the optimizer. The final optimal solution can be found by exhausting all potential combinations of the options among all candidate cell sites.

When the number of candidate sites is large, due to the complexity of the solution, one or more greedy procedures or greedy algorithms can be implemented by the planning engine component 102 to reduce and/or mitigate the complexity of the problem and effectively solve the problem. Further details related to the modular components of the planning engine component 102 and the one or more greedy algorithms will be provided in further detail below.

With continuing reference to FIG. 1, the transmitter/receiver component 106 can receive from network equipment (not shown), another apparatus (not shown), and/or another system (not shown) and/or user equipment (not shown) one or more parameters that can be utilized as the input data 114, one or more network considerations (e.g., capacity driven information, coverage driven information, and so on) in order to analyze the current network deployment and perform network planning as discussed herein.

The at least one memory 108 can be operatively connected to the at least one processor 110. The at least one memory 108 and/or the at least one data store 112 can store executable instructions that, when executed by the at least one processor 110 can facilitate performance of operations. Further, the at least one processor 110 can be utilized to execute computer executable components stored in the at least one memory 108 and/or the at least one data store 112.

For example, the at least one memory 108 can store protocols associated with evaluating one or more options for the nodes or network equipment within the communication network as discussed herein. Further, the at least one memory 108 can facilitate action to control communication between the system 100, other apparatuses, other systems, network equipment, and/or user equipment associated with the network(s) under consideration, and so on, such that the system 100 can employ stored protocols and/or processes to facilitate implementation of communication network deployment through network planning in advanced networks as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically Programmable ROM (EPROM), Electrically Erasable ROM (EEPROM), or flash memory. Volatile memory can include Random Access Memory (RAM), which acts as external cache memory. By way of example and not limitation, RAM is available in many forms such as Synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DRRAM). Memory of the disclosed aspects are intended to include, without being limited to, these and other suitable types of memory.

The at least one processor 110 can facilitate respective analysis of information related to implementation of communication network deployment through network planning in advanced networks. The at least one processor 110 can be a processor dedicated to analyzing and/or generating information received, a processor that controls one or more components of the system 100, and/or a processor that both analyzes and generates information received and controls one or more components of the system 100.

Figure 2:
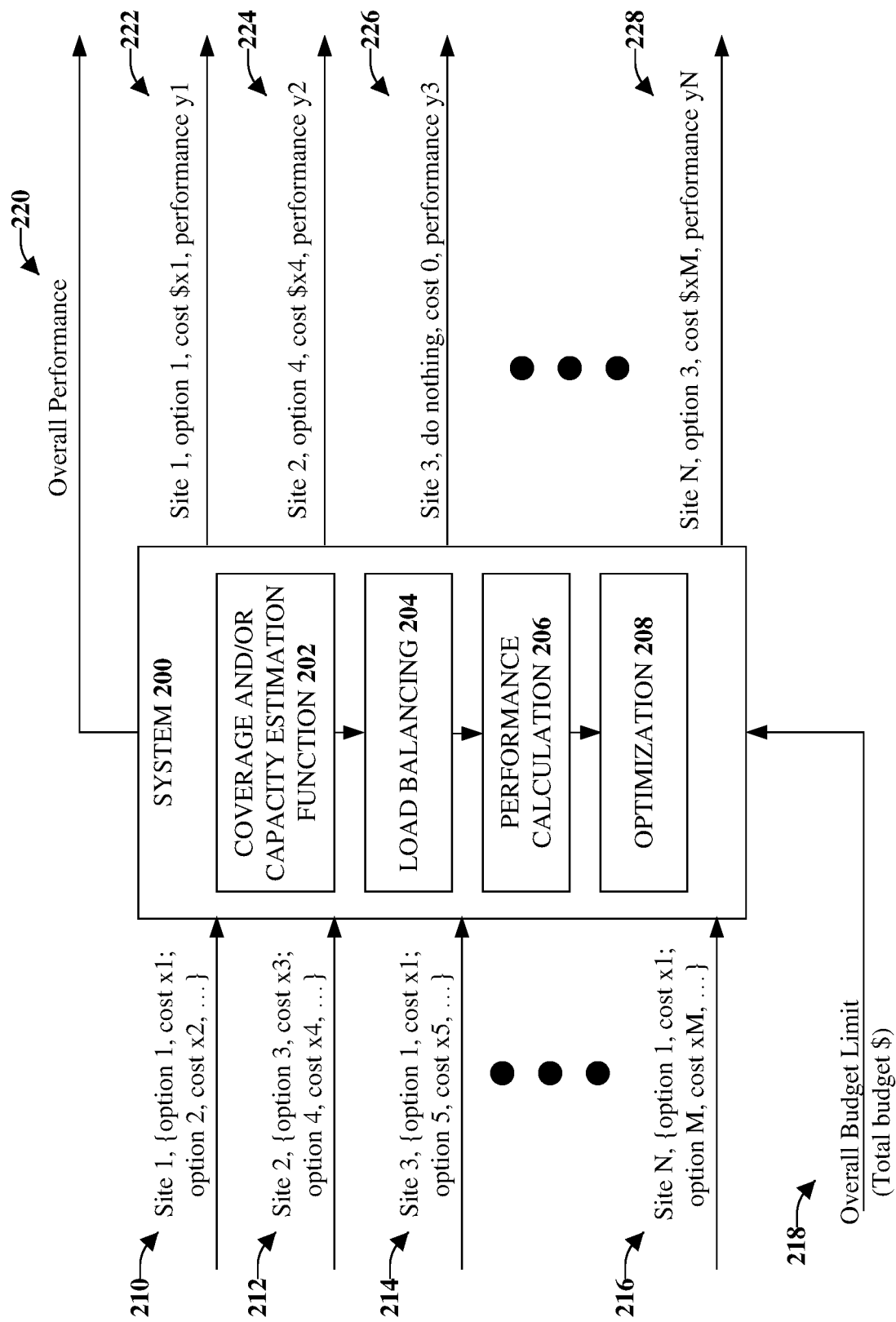
FIG. 2 illustrates an example, non-limiting, system that, based on input data, determines a rank-ordering of actions taken during network deployment and optimization of communication networks in accordance with one or more embodiments described herein.

FIG. 2 illustrates an example, non-limiting, system 200 that, based on input data, determines a rank-ordering of actions taken during network deployment and optimization of communication networks in accordance with one or more embodiments described herein. Repetitive description of like elements employed in other embodiments described herein is omitted for sake of brevity. The system 200 can include one or more of the components and/or functionality of the system 100, other systems, and/or computer-implemented methods, and vice versa.

The system 200 can be a modular system and can include a coverage and/or capacity estimation function 202, a load balancing function 204, a performance calculation function 206, and an optimization function 208. The various functions can be implemented as modular components and/or a modular system wherein the functions are decoupled from one another. According to some implementations, the various functions can be performed by the planning engine component 102.

The inputs (e.g., input data 114) to the system 200 include each site's upgrade options and associated costs. For example, first inputs 210 can include inputs for a first site (Site 1), illustrated as a first option (option 1), costs for option 1 (cost x1), a second option (option 2), costs for option 2 (cost x2), and so on, wherein any number of options and associated costs can be included in the first inputs 210. Second inputs 212 can include inputs for a second site (Site 2), illustrated as a third option (option 3), costs for option 3 (cost x3), a fourth option (option 4), costs for option 4 (cost x4), and so on, wherein any number of options and associated costs can be included in the second inputs 212. Third inputs 214 can include inputs for a third site (Site 1), illustrated as a first option (option 1), costs for option 1 (cost x1), a fifth option (option 5), costs for option 5 (cost x5), and so on, wherein any number of options and associated costs can be included in the third inputs 214. Also illustrated are fourth inputs 216, which can include inputs for an N site (Site N), illustrated as a first option (option 1), costs for option 1 (cost x1), an M option (option M), costs for option M (cost xM), and so on, wherein any number of options and associated costs can be included in the fourth inputs 216. It is noted that more than four groups of inputs (e.g., first inputs 210, second inputs 212, third inputs 214, fourth inputs 216) can be provided to the system 200 as input data (e.g., when there are more than four sites under consideration).

The input data can also include the overall budget limit 218. The overall budget limit 218 can be a parameter, which can be expressed as a financial or monetary unit, such as U.S. dollars, pounds sterling, or another unit (e.g., a digital currency, a virtual currency, and so on). According to an example, the budget limit can be a total budget expressed in monetary units. The system 200 can perform a series of predictions and can calculate and optimize the overall performance under the budget limit as discussed herein.

The system 200 outputs (e.g., the output data 116), an indication of the overall performance 220 and a breakdown of the update decision, cost, and performance for each site. For example, the system 200 can determine that the first option (option 1) should be implemented for site 1. Thus, first outputs 222 can include the update decision for site 1 (option 1), cost for implementation of option 1 (cost $x1), and a performance for implementation of option 1 (performance y1). In this example, the system 200 can determine that the fourth option (option 4) should be implemented for site 2. Thus, second outputs 224 can include the update decision for Site 2 (option 4), cost for implementation of option 4 (cost $x4), and a performance for implementation of option 4 (performance y2). Further to this example, the system 200 can determine that no updates or changes should be made to site 3. Thus, third outputs 226 can include an indication to do nothing to site 3, the cost is zero (cost 0), and an indication of the performance of site 3 (performance y3). The system also can determine, in this example, that option 3 should be implemented at site N. Thus, fourth outputs 228 can include an indication to implement option 3 for site N (option 3), the cost of implementing the option (cost $xM), and the performance expected for site N based on implementing option 3 (performance yN). It is noted that more than four groups of outputs (e.g., first outputs 222, second outputs 224, third outputs 226, fourth outputs 228) can be output by the system 200 as output data (e.g., if there are more than four sites under consideration).

Figure 3:
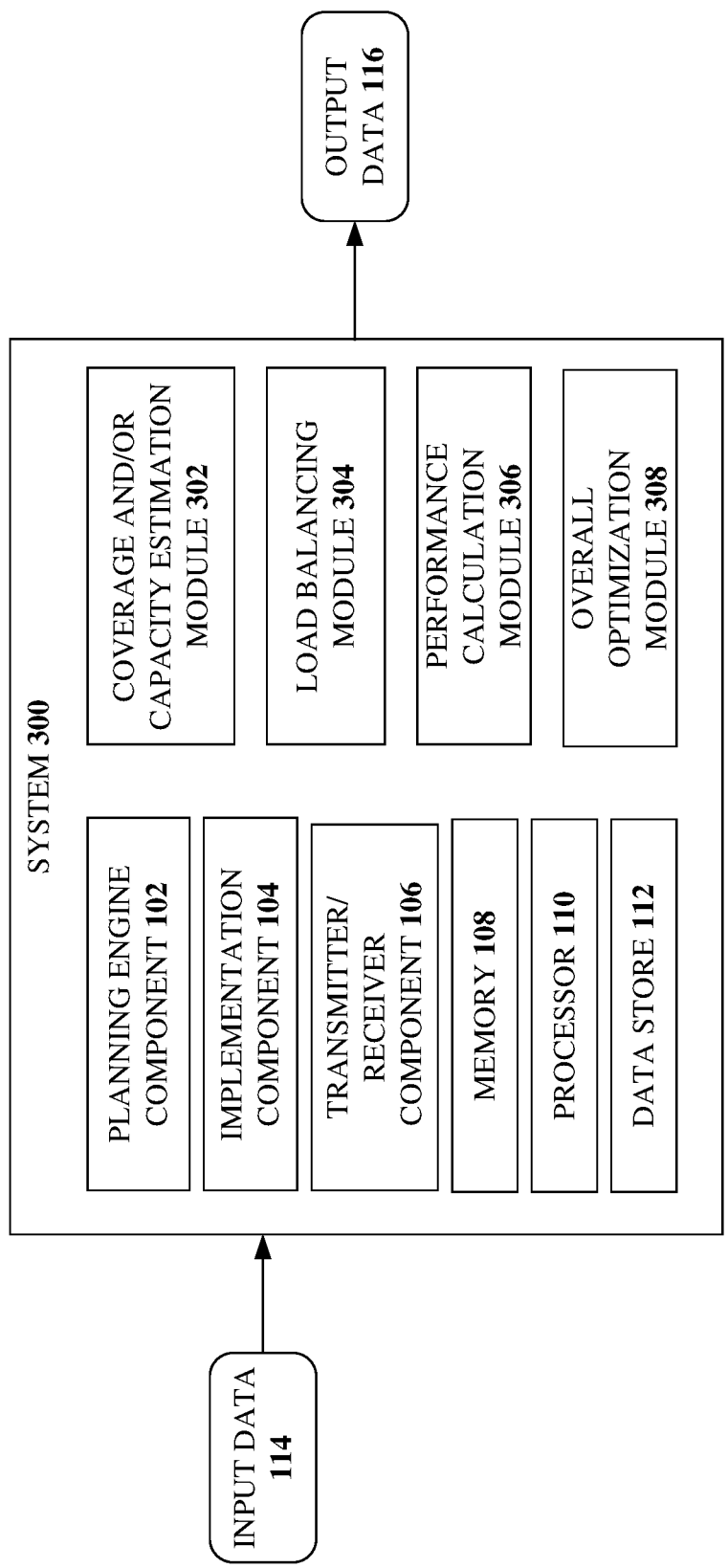
FIG. 3 illustrates an example, non-limiting, system that includes modular functions in accordance with one or more embodiments described herein.

FIG. 3 illustrates an example, non-limiting, system 300 that includes modular functions in accordance with one or more embodiments described herein. Repetitive description of like elements employed in other embodiments described herein is omitted for sake of brevity. The system 300 can include one or more of the components and/or functionality of the system 100, the system 200, other systems, and/or computer-implemented methods, and vice versa.

The modular functions of the system 300 can operate in parallel and separate from one another (e.g., can perform their respective functions while other functions of the modular functions are performing their respective functions at the same time, at substantially the same time, and/or at different times).

Further, the modular functions can be implemented by the planning engine component 102 and can include, but are not limited to, a coverage and/or capacity estimation module 302, a load balancing module 304, a performance calculation module 306, and an overall optimization module 308. The modules illustrated in FIG. 3 (e.g., coverage and/or capacity estimation module 302, load balancing module 304, performance calculation module 306, and overall optimization module 308) are for purposes of describing the one or more embodiments. Modules in addition to those shown and described herein can be included in one or more embodiments. The modules illustrated and described capture the metrics (e.g., some of the major metrics) for network performance evaluation and optimization as discussed herein.

These modules (e.g., coverage and/or capacity estimation module 302, load balancing module 304, performance calculation module 306, and overall optimization module 308) can be used to answer many "what-if" questions related to network deployment and/or optimization. For example, a what-if question can be how the performance will change when traffic grows by X %.

The coverage and/or capacity estimation module 302 can be configured to estimate and/or predict new network capacities when an option is executed and/or assumed. The coverage and/or capacity estimation module 302 can facilitate load-aware radio access network resource allocations as discussed with respect to the section labeled "Coverage/Capacity Estimation Section" included between FIG. 8 and FIG. 9.

The load balancing module 304 can be configured to redistribute traffic (e.g., network traffic, communication traffic, and so on) when there is a change in network capacity. For example, move a fraction of traffic to the new carrier when the new carrier is deployed. The load balancing can redistribute the traffic because, due to new carriers, there will be new (e.g., additional UEs) connecting to the new carriers and load balancing should be performed to balance the network traffic load among the current carriers and the newly added carriers. The load balancing module 304 can facilitate load balancing with respect to the sections labeled "Load Balancing Section (1)" and/or "Load Balancing Section (2)" included between FIG. 8 and FIG. 9.

When there are capacity and traffic changes, the performance changes also. Therefore, the performance calculation module 306 can be configured to re-calculate the user performance for each site under each option. The performance calculation module 306 can facilitate network resource dimensioning as discussed with respect to the section labeled "Performance Calculation Section" included between FIG. 8 and FIG. 9.

Further, the overall optimization module 308 can be configured to maximize the overall investment return by using the most cost-effective options. Such cost-effective options include, but are not limited to, new site builds, small cells, carrier additions, and so on. The overall optimization module 308 can determine the most cost-effective options subject to user performance target (e.g., throughput, coverage, and so on), capital budget and inspection capacity (e.g., how many new sites can be established for a given time period, and so on).

Methods that can be implemented in accordance with the disclosed subject matter, will be better appreciated with reference to the above flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 4:
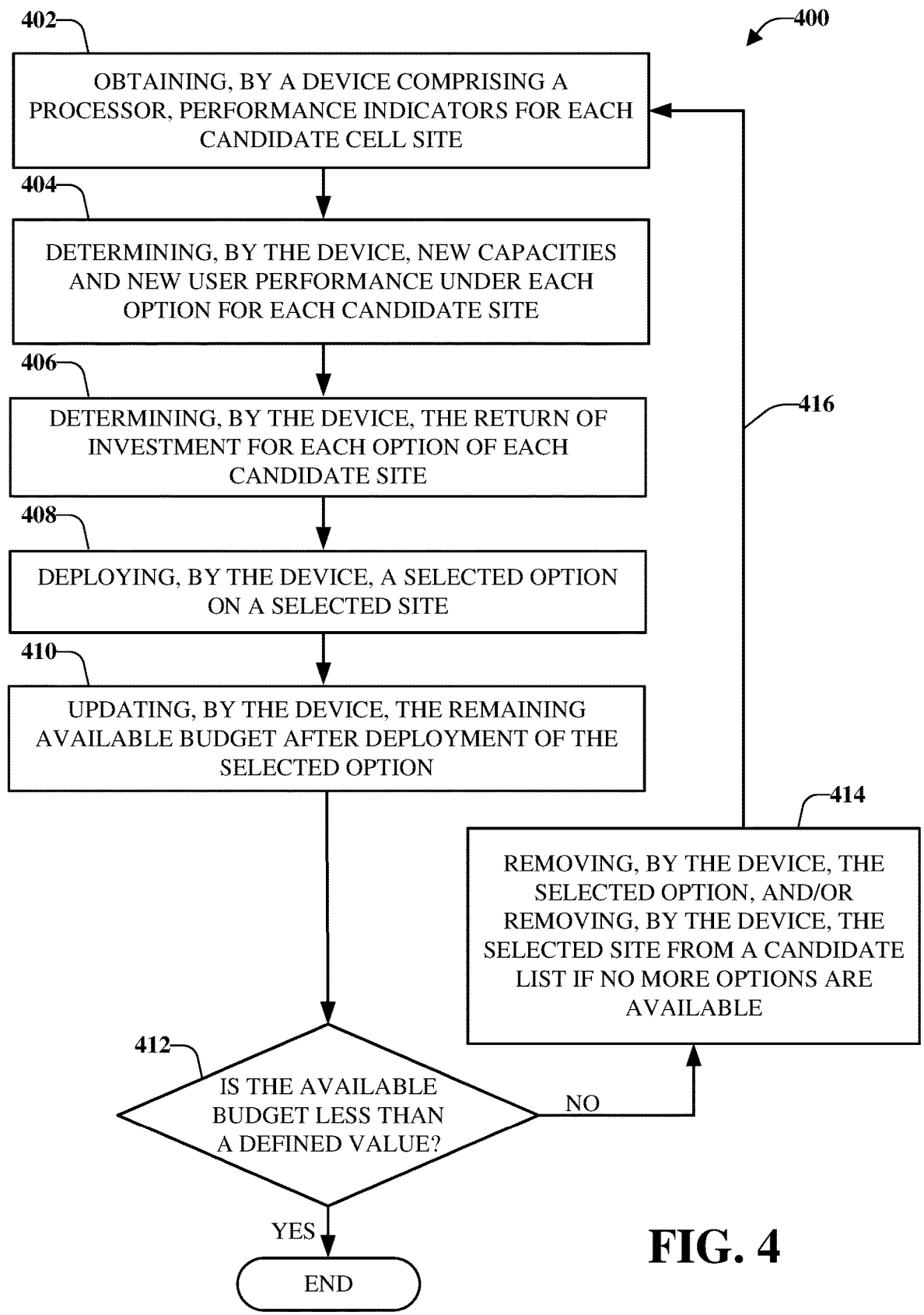
FIG. 4 illustrates an example, non-limiting, computer-implemented method for using a greedy procedure for determining an optimal return of investment in accordance with one or more embodiments described herein.

FIG. 4 illustrates an example, non-limiting, computer-implemented method 400 for using a greedy algorithm for determining an optimal return of investment in accordance with one or more embodiments described herein. The computer-implemented method 400 can be implemented by a system including a processor (e.g., the system 100, the system 200, the system 300, and other systems), network equipment including a processor, or another computer-implemented device including a processor.

To address the complexity of the problem discussed above with respect to Equations 1 and 2, systems that include capacity estimation, load balancing, and performance calculation modules to provide necessary inputs for the optimization module (e.g., the optimization function 208, the overall optimization module 308) are provided. To further reduce complexity of the optimization process, a greedy procedure (e.g., a greedy algorithm), as illustrated in FIG. 4 can be performed, such that the highly non-linear problem can be simplified.

The computer-implemented method 400 starts at 402 with collection of performance metrics (e.g., performance indicators, KPIs, and so on) for each cell site n. The collection of performance metrics can include cell capacity, resource utilization, user performance ($QoE_n$), and so on.

At 404, new capacities and new user performance $QoE_{n,p}$ under each option p for each candidate site n can be determined or calculated. For example, to determine the new capacities and new user performance for each option for each cell site, a modular system can be utilized (e.g., the system 100, the system 200, the system 300).

The return of investment for each option p for each candidate site n can be determined, at 406 of the computer-implemented method 400. For example, calculate the ROI for each option p of site n, $\Delta R_{n,p} = f(QoE_{n,p}) - f(QoE_n)$. Calculate $\Delta I_{n,p} = \Delta R_{n,p}/X_{n,p}$ where $X_{n,p}$ is the cost of deploying option p on site n.

Further, at 408, a selected option p' is deployed on site n'. For example, the selected option p' to deploy on site n' can be determined based on $$(n', p') = \underset{n,p}{\mathrm{argmax}}(\Delta I_{n,p}).$$

The available budget remaining after deployment of the selected option can be updated, at 410 of the computer-implemented method. For example, the overall available budget can be reduced by the cost of deploying the option, at 408. Thus, the available budget M can be updated as $M = M - X_{p',n'}$.

At 412, a determination can be made whether the available budget M (e.g., the budget remaining after the selected option is deployed) is less than or equal to zero (M<=0). If there is budget remaining (e.g., the available budget is more than zero, or more than a defined threshold amount), the result of the decision at 410 is "NO." In this case, the computer-implemented method 400 continues, at 414, where option p' for site n' is removed. If no more options are available, at 414, site n' is removed from candidate list. Computer-implemented method 400 returns to 402 via feedback loop 416 and collects more performance metrics for more candidate sell sites and the process repeats as many times as needed until the determination at 412 is that there is no available budget remaining ("YES"), and the computer-implemented method 400 ends.

Figure 5:
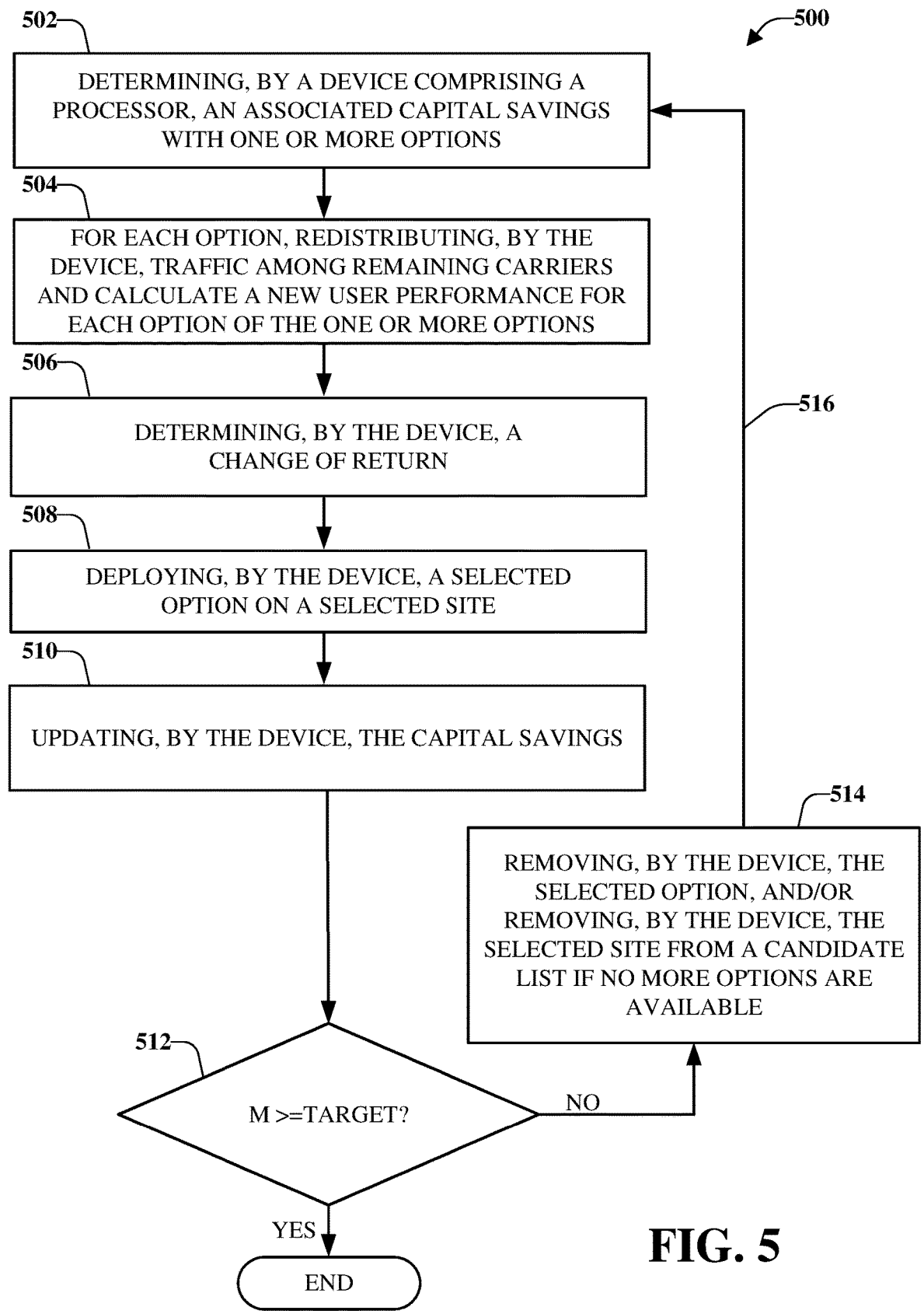
FIG. 5 illustrates an example, non-limiting, computer-implemented method for using a greedy procedure for determining capital savings in accordance with one or more embodiments described herein.

FIG. 5 illustrates an example, non-limiting, computer-implemented method 500 for using a greedy procedure for determining capital savings in accordance with one or more embodiments described herein. The computer-implemented method 500 can be implemented by a system including a processor (e.g., the system 100, the system 200, the system 300, and other systems), network equipment including a processor, or another computer-implemented device including a processor.

The embodiments discussed herein have the flexibility to address various different problems. The greedy procedure or greedy algorithm, when slightly modified, can be used to solve a different optimization problem, such as, for example, capital saving.

Assume that the market plans to deploy a number of carriers in a future period, which may exceed the budget limit due to a budget change and/or a budget reduction. In order to save the capital without impacting (or without significantly impacting) user experience, it is desirable to know which sites and/or carriers can be removed from the list to minimize the performance impact. Using the same system (e.g., the system 100, the system 200, the system 300) and a slightly different greedy algorithm as compared to FIG. 4, the problem can be easily solved.

At 502 of the computer-implemented method 500, for each candidate site n, assume there are certain options of removing planned carriers and determine that the associated capital saving with option p is $X_{n,p}$. For each option, at 504, redistribute traffic among remaining carriers and calculate a new user experience $QoE_{n,p}$. According to some implementations, redistributing the traffic can be performed using a modular system as discussed herein.

Further, at 506, a change of return $\Delta R_{n,p}$ can be determined. For example, to determine the change of return, the following equation, $\Delta R_{n,p} = f(QoE_{n,p}) - f(QoE_n)$, can be utilized and calculate $\Delta I_{n,p} = \Delta R_{n,p}/X_{n,p}$. Based on the determination a selected option p' can be deployed, at 508, on selected site n' based on $$(n', p') = \underset{n,p}{\mathrm{argmax}}(\Delta I_{n,p}),$$

The capital saving M (initialized as 0) can be updated at 510, where $M = M + X_{p',n'}$.

At 512, a determination can be made whether the capital savings M is still more than or equal to a target value (M>=target). If the capital savings is less than the target ("NO"), the method continues, at 514, and the selected option p' for the selected site n' can be removed. Alternatively, if no more options are available, at 514, the selected site n' can be removed from the candidate list. Computer-implemented method 500 returns to 202 via feedback loop 516 and another associated capital savings with one or more options is determined and the process repeats as many times as needed until the determination at 512 is that the capital savings is more than or equal to than the target ("YES"), and the computer-implemented method 500 ends.

Figure 6:
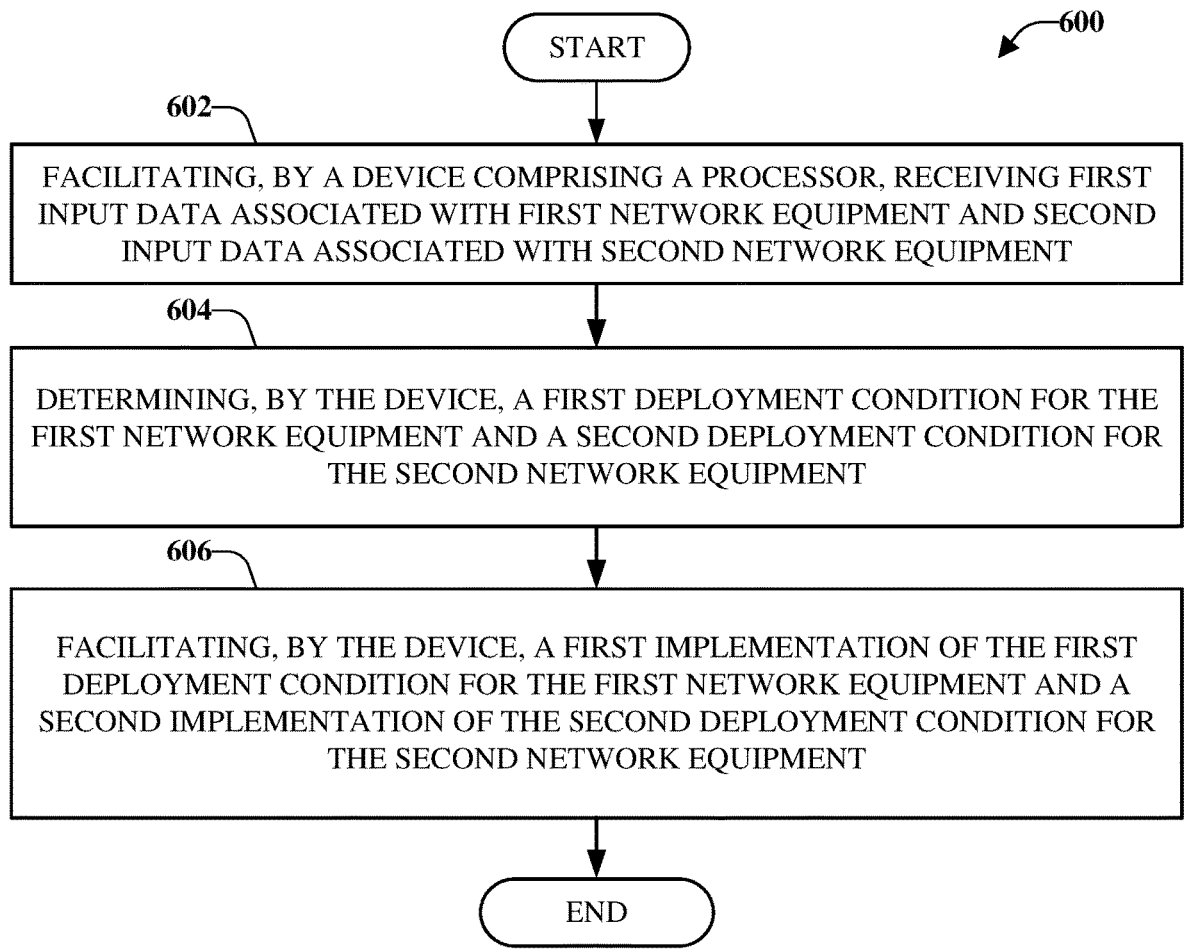
FIG. 6 illustrates an example, non-limiting, computer-implemented method for network planning in accordance with one or more embodiments described herein.

FIG. 6 illustrates an example, non-limiting, computer-implemented method 600 for network planning in accordance with one or more embodiments described herein. The computer-implemented method 600 can be implemented by a system including a processor (e.g., the system 100, the system 200, the system 300, and other systems), network equipment including a processor, or another computer-implemented device including a processor.

At 602, receipt of first input data associated with first network equipment and second input data associated with second network equipment can be facilitated. The first input data can include first alternative deployment conditions and respective first criteria of the first alternative deployment conditions for the first network equipment. The second input data can include second alternative deployment conditions and respective second criteria of the second alternative deployment conditions for the second network equipment.

A first deployment condition for the first network equipment and a second deployment condition for the second network equipment can be determined at 604. The first deployment condition can be selected from the first alternative deployment conditions and the second deployment condition can be selected from the second alternative deployment conditions. A first criterion of the respective first criteria can be defined for the first deployment condition and a second criterion of the respective second criteria can be defined for the second deployment condition. Further, an aggregation of the first criterion and the second criterion can satisfy a function that indicates at least a defined criterion.

According to some implementations, determining the first deployment condition and the second deployment condition can include modeling capacity estimates based on execution of the first alternative deployment conditions and the second alternative deployment conditions. The modeling can include utilizing a modular approach for the modeling.

In some implementations, determining the first deployment condition and the second deployment condition can include modeling traffic distribution based on execution of the first alternative deployment conditions and the second alternative deployment conditions and based on detection of a change in network capacity. The modeling can include utilizing a modular approach for the modeling.

In additional or alternative implementations, determining the first deployment condition and the second deployment condition can include modeling user performance (e.g., QoE) based on execution of the first alternative deployment conditions and the second alternative deployment conditions and based on a detection of a network traffic change.

In additional or alternative implementations, determining the first deployment condition and the second deployment condition can include modeling based on execution of the first alternative deployment conditions and the second alternative deployment conditions and based on a change in network capacity or network traffic. The modeling includes utilizing a modular approach and selecting the first deployment condition and the second deployment condition that are determined to retain associated costs below a threshold cost level.

At 606 of the computer-implemented method 600, a first implementation of the first deployment condition for the first network equipment and a second implementation of the second deployment condition for the second network equipment can be facilitated. Implementation of the first deployment condition and/or the second deployment condition can include performing no action, deploying additional network equipment for use in conjunction with the other network equipment (e.g., currently deployed network equipment), deploying carrier additions, deploying small cells, and so on.

Figure 7:
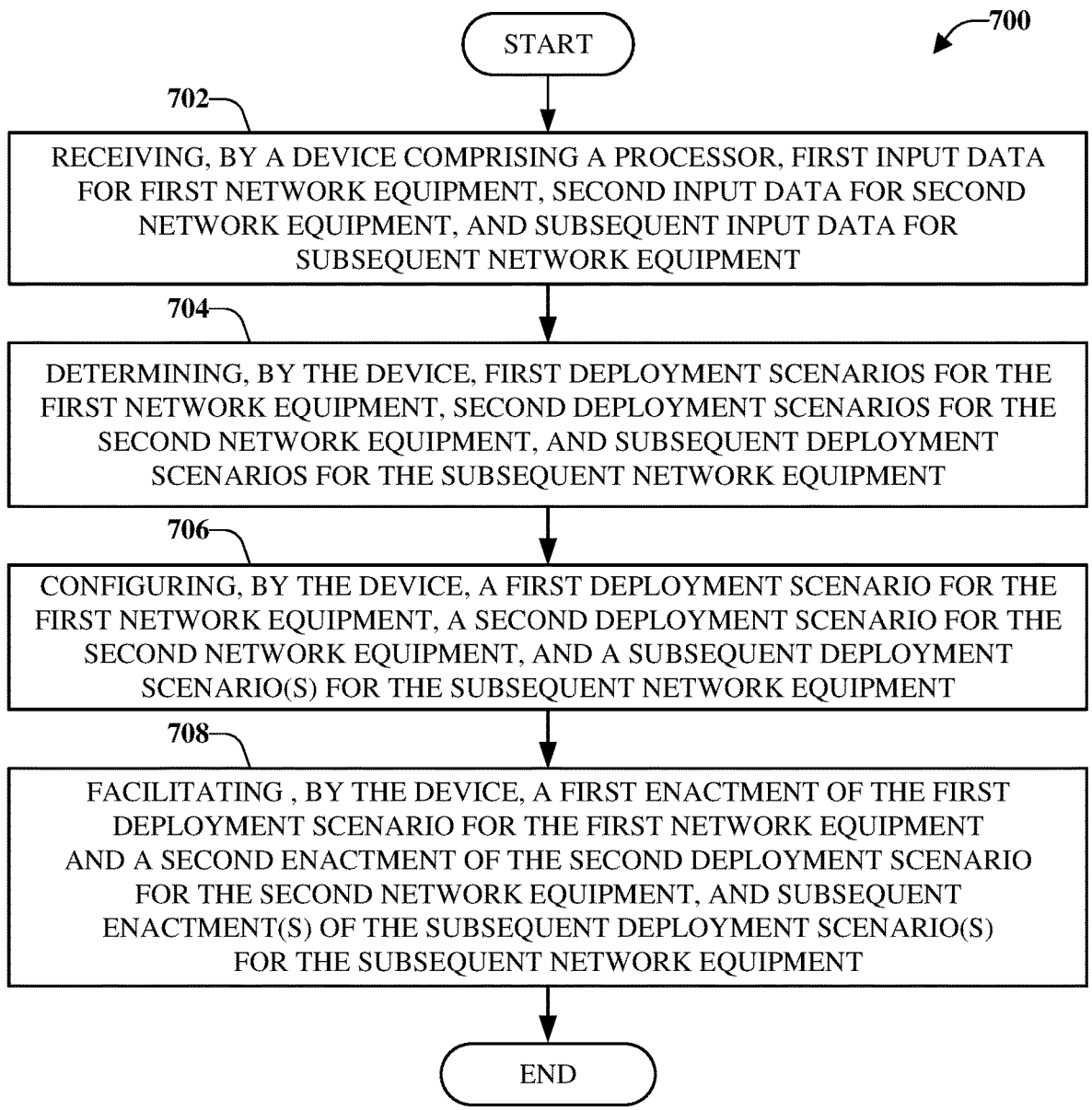
FIG. 7 illustrates an example, non-limiting, computer-implemented method for facilitating network planning while considering various deployment parameters and constraints in accordance with one or more embodiments described herein.

FIG. 7 illustrates an example, non-limiting, computer-implemented method 700 for facilitating network planning while considering various deployment parameters and constraints in accordance with one or more embodiments described herein. The computer-implemented method 700 can be implemented by a system including a processor (e.g., the system 100, the system 200, the system 300, and other systems), network equipment including a processor, or another computer-implemented device including a processor.

At 702, first input data for the first network equipment and second input data for the second network equipment, and subsequent input data for subsequent network equipment is received. The first input data can include first upgrade options for the first network equipment and respective first totals for the first upgrade options. The second input data can include second upgrade options for the second network equipment and respective second totals for the second upgrade options. The subsequent input data can include subsequent upgrade options for the subsequent network equipment and respective subsequent totals for the subsequent upgrade options.

At 704, first deployment scenarios for the first network equipment, second deployment scenarios for the second network equipment, and subsequent deployment scenarios for the subsequent network equipment is determined. The first deployment scenarios can be determined based on first reported quality of experience of first user equipment within a first geographic area of the first network equipment. The second deployment scenarios can be determined based on second reported quality of experience of second user equipment within a second geographic area of the second network equipment. Further, the subsequent deployment scenarios can be determined based on subsequent reported quality of experience of subsequent user equipment within subsequent geographic areas of the subsequent network equipment.

At 706, a first deployment scenario (e.g., the first outputs 222) for the first network equipment, a second deployment scenario (e.g., the second outputs 224) for the second network equipment, and a subsequent deployment scenario (e.g., the third outputs 226, the fourth outputs 228, and so on) for the subsequent network equipment are configured. The first deployment scenario is selected from a group of first deployment scenarios (e.g., the first inputs 210) and includes a first parameter. The second deployment scenario is selected from a group of second deployment scenarios (e.g., the second inputs 212) and includes a second parameter. The subsequent deployment scenarios are selected from respective groups of subsequent deployment scenarios (e.g., the third inputs 214, the fourth inputs 216, and so on) and includes respective subsequent parameters. Configuring the deployment scenarios can include determining that a sum of the first parameter, the second parameter, and the subsequent parameters satisfies a function of a defined parameter level (e.g., a cost budget, the overall budget limit 218).

The computer-implemented method 700 can continue, at 708, with facilitating a first enactment of the first deployment scenario for the first network equipment, a second enactment of the second deployment scenario for the second network equipment, and subsequent enactments of the subsequent deployment scenarios for the subsequent network equipment. According to some implementations, facilitating the various deployment scenarios can include scheduling the actions to be performed, automatically configuring new equipment, automatically upgrading equipment, providing output via, for example, a user interface with one or more recommendations related to network deployment and planning as discussed herein, and so on.

Figure 8:
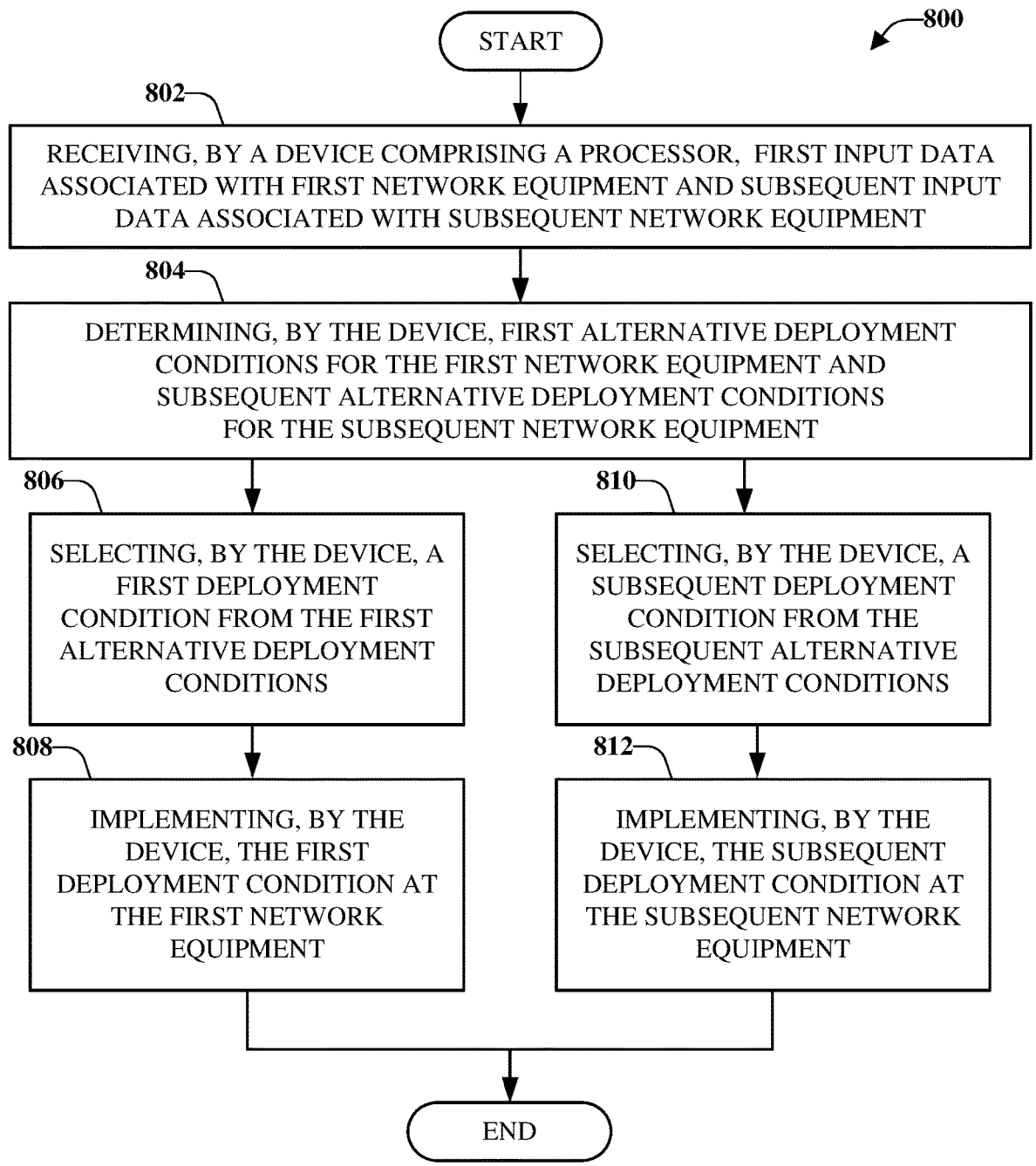
FIG. 8 illustrates an example, non-limiting, computer-implemented method for implementing deployment of network resources based on network planning in accordance with one or more embodiments described herein.

FIG. 8 illustrates an example, non-limiting, computer-implemented method 800 for implementing deployment of network resources based on network planning in accordance with one or more embodiments described herein. The computer-implemented method 800 can be implemented by a system including a processor (e.g., the system 100, the system 200, the system 300, and other systems), network equipment including a processor, or another computer-implemented device including a processor.

At 802, first input data associated with first network equipment and second input data associated with second network equipment can be received. The first input data can include first upgrade options for first network equipment, respective first parameters for the first upgrade options, and a defined threshold for a combination of the respective first parameters and respective second parameters of the second network equipment. The second input data can include second upgrade options for the second network equipment, respective second parameters for the second upgrade options, and the defined threshold. In an example, the respective first parameters can include first financial data and the respective second parameters can include second financial data. Further, the defined threshold can include a financial budget limit.

First alternative deployment conditions for the first network equipment and second alternative deployment conditions for the second network equipment can be determined, at 804. The determination can be based on reported quality of experience of user equipment within a geographic area.

A first deployment condition for the first network equipment can be selected from the first alternative deployment conditions, at 806. Upon or after selection of the first deployment condition, at 808, the first deployment condition can be implemented at the first network equipment. To implement the first deployment condition, an action can be selected from a group of actions. According to some implementations, facilitating the first implementation of the first deployment condition includes deploying third network equipment for use with the first network equipment. In some implementations, facilitating the first implementation of the first deployment condition includes deploying small cells for use with the first network equipment. Facilitating the first implementation of the first deployment condition can include, according to some implementations, deploying carrier additions for use with the first network equipment. Alternatively, in some implementations, the first deployment condition includes no changes to the first network equipment, and wherein facilitating the first implementation of the first deployment condition includes taking no action (e.g., performing no activity). In an example, no changes might be made if it determined that the cost to upgrade is not justified. For example, there might be one carrier carrying the traffic, but the number of UEs in the area is too small to cause a significant impact. In this case, the upgrade for the site can be given a lower priority than other sites that have a larger impact due to a large number of UEs connected to that site.

A second (or subsequent) deployment condition for the second (or subsequent) network equipment can be selected from the second (or subsequent) alternative deployment conditions, at 810. Upon or after selection of the second (or subsequent) deployment condition, at 812, the second (or subsequent) deployment condition can be implemented at the second (or subsequent) network equipment. To implement the second (or subsequent) deployment condition, an action can be selected from a group of actions. The group of actions can include, but are not limited to, deploying additional network equipment, deploying small cells or macro cells, deploying carrier additions, or performing no activity.

As discussed herein, how to optimally plan the network under budget constraints can be challenging. Network planning is a highly non-linear optimization problem that is difficult to model and to solve. Instead of modeling the network planning problem in a traditional, mathematical way, the disclosed embodiments solve the problem by using a modular system that decouples the complex relations among different aspects. In the disclosed embodiments, certain modules can assist with determining the necessary inputs to the optimization module, and then the optimal solution is searched using proposed greedy procedures, for example. The use of modular systems with greedy procedures to solve complicated network planning issue has many applications that can not only augment current 4G LTE networks, it can also be deployed in emerging 5G networks and also in planning future networks beyond 5G.

As mentioned, heated competition can force wireless operators to continually invest in the networks to improve the download and upload speeds. To invest smartly, the disclosed embodiments provide a tool that can determine how to invest in the network such that best performance can be achieved with the least amount of finances invested. The traditional way of augmenting a network is based on engineering experience with continuous monitoring of the network KPIs, and the decisions are made based on ad-hoc and/or short-term analysis, which lack both holistic optimization and a long-term view.

Further, it can be a daunting task to model the problem in the traditional way, because of the entanglement of multiple parameters among upgrade options, capacity, traffic distribution, performance, and so on. Even if the problem can be modeled, it is highly non-linear and difficult to solve. To deal with these challenges, the disclosed embodiments provide a modular system to decouple the different aspects mentioned above. The embodiments include various modules which, when put together, can be used as a multi-purpose tool to solve various different problems. Effective greedy algorithms can be implemented to search optimal solutions, which reduces the complexity caused by the non-linearity of the problem.

Technical benefits of the modular system of the disclosed embodiments provides a flexible solution to various problems and, thus, the modular system is a powerful multi-purpose tool. The modular system can provide insights to many "what-if" questions such that there can be a better understanding on the impact of certain investment related (or unrelated) changes. The greedy algorithms in the optimization module avoid the complexity of the highly non-linear nature of the original optimization problem and are easy to implement. The greedy algorithms can be adjusted flexibly to solve different optimization problems with different investment options and/or objectives. Benefits include, but are not limited to, improving user experience at reasonable investment.

Described herein are systems, methods, articles of manufacture, and other embodiments or implementations that can facilitate implementation of communication network deployment through network planning for advanced networks. facilitating implementation of communication network deployment and planning through network planning for advanced networks can be implemented in connection with any type of device with a connection to the communication network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

The term network equipment is used herein to refer to any type of network node serving UE and/or connected to other network equipment, network nodes, network elements, or another network node from which the UEs can receive a radio signal. In cellular radio access networks (e.g., Universal Mobile Telecommunications System (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also include multiple antennas for performing various transmission operations (e.g., MIMO operations). A network node can include a cabinet and other protected enclosures, an antenna mast, and actual antennas. Network nodes can serve several cells, also called sectors, depending on the configuration and type of antenna. Examples of network nodes can include but are not limited to: NodeB devices, base station (BS) devices, access point (AP) devices, and radio access network (RAN) devices. The network nodes can also include Multi-Standard Radio (MSR) radio node devices, including: an MSR BS, an eNode B, a network controller, a Radio Network Controller (RNC), Base Station Controller (BSC), a relay, a donor node controlling relay, a Base Transceiver Station (BTS), an Access Point (AP), a transmission point, a transmission node, a Remote Radio Unit (RRU), a Remote Radio Head (RRH), nodes in distributed antenna system (DAS), and the like.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can include an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can include the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Coverage/Capacity Estimation Section

Coverage and/or capacity estimation (e.g., in connection with the coverage and/or capacity estimation function 202, the coverage and/or capacity estimation module 302, and so on) can facilitate allocating and/or dimensioning resources in a network and/or distributing traffic, demand, and/or load among the resources.

As discussed herein, network equipment can provide service or coverage to one or more UEs. The coverage can be divided into multiple sectors/faces, each of which can be further divided into one or more cells. Each cell within a sector/face can operate at a distinct carrier frequency and the use of multiple carrier frequencies within a sector/face can enhance a data carrying capacity, a QoE, and/or a QoS. The UEs can obtain service via respective sector/faces and/or can migrate from a scope of coverage associated with one sector/face to a scope of coverage associated with a second sector/face (e.g., a handover of a communication session).

Coverage/capacity estimation can be configured to generate profiles for each cell of the network. The profiles, which can include or can be based on various parameters (e.g., signals, interference, noise, etc.), and can be specified in an uplink (UL) direction, a downlink (DL) direction, or both the UL and DL directions. For example, a signal-to-interference-plus-noise (SINR) profile (or other forms and/or types of quality metrics) for a cell can be generated based at least in part on estimates and/or projections of the UE being located within the cell, estimates/projections of a communication session of the UE falling within a given SINR class/category, and/or estimates/projections and/or measurements of throughput within the given SINR class/category.

Coverage/capacity estimation can be configured to generate forecasts of traffic in the network, while considering a type of traffic (e.g., voice and video), and elasticity in terms of data volume at different priority levels/classes. The forecasts can be based on traffic projections at a given level of granularity.

Based on the profiles and the forecasts, dimensioned resource allocations (e.g., radio spectrum, communication bandwidth, capacity, transmission power, processing resources, modulation schemes, etc., or any combination thereof) can be generated based on further QoS requirements, such as average user throughput per traffic class, etc.

As it relates to coverage/capacity estimation, an area (e.g., a geographical area or region) where cells can be (or have been) deployed can be divided/segmented into bins. Each of the bins can be associated with a respect index b. With a total of M bins, the indices can range from b=1 to b=M.

At a given sector/face, there can be a total of f potential carriers/cells. Each of the carriers/cells can be referenced by an index j, from j=1 to j=f. Additionally, each of the carriers/cells j can have up to K bandwidth subscription options/levels and can be referenced by an index i, from i=1 to i=K. When carrier j is deployed at subscription level i, the number of physical resource blocks (PRBs) available from the carrier can be denoted as $B_{j,i}$.

In this example, it can be assumed that in a particular sector/face and dimensioning epoch (e.g., a month or other time frame) that y cells/carriers are already deployed per dimensioning exercises conducted in the past, where y; P. Additionally, it can be assumed that for each of the carriers j=1 to j=y-1 that the carrier is already at its maximum subscription level (i=K), and thus has the maximal number $B_{j,K}$ resource blocks deployed. The final carrier (j=$\Psi$) can be at any of its possible subscription levels (e.g., any of i=1 to i=K), and thus, can have a resource block allocation of $B_{\Psi,i}$.

As mentioned, the capacity/coverage estimation can be configured to identify/determine a dimensioning of resources in a given sector/face, starting from a current deployment (y, i). The capacity/coverage estimation can be executed based on a passage of time (e.g., the start of a new epoch or planning for subsequent time periods), in response to an occurrence of one or more events or conditions (e.g., UEs enrolling in a service of a network operator/provider), or at other times.

Further, one or more input parameters can be obtained. The one or more input parameters can include information regarding cells associated with the sector/face; infrastructure (e.g., power configurations/power levels, number or availability of transmitters and/or receivers, number or availability of antennas, etc.); propagation models (e.g., how power fades over time or distance); a distribution of UEs within the sector/face (e.g., information can be obtained regarding a position of the UEs relative to one or more cell perimeters/edges); capacity, resource utilization, and other statistics of the real deployment as the initial state (which could change over time when the traffic forecast and network deployment change) of the cells.

A variable directed to the epoch can be initialized to a first time period within the epoch (e.g., a year can be divided into discrete months, resulting in a potential value for the variable from 1 to 12 (where each increment in value corresponds to a given month in the year), or other epoch/time periods can be broken down (e.g., quarterly, over a period of a few weeks, etc.). A forecast of traffic load/demand can be obtained for the given time period in the epoch based, at least in part, on logs/records of demand for previous time periods, service agreements/contracts entered into by users, users declining to renew service at the expiration of their respective agreements/contracts (or failing to pay subscription/service fees), etc. The forecast of traffic load/demand can be specified in one or more terms, such as for example a busy hour (BH) forecast corresponding to expected peak traffic demands/loads.

A determination can be made regarding coverage provided by the sector/face. The determination can be executed once for each cell included in the sector/face, in terms of a DL direction and/or an UL direction, for example.

A SINR and/or a capacity can be calculated. For example, profiles/values for UEs located within the sector/face can be computed/determined. The SINR profiles/values can map to throughput values, which in turn can map to capacities for the cells in the sector/face. The load for the sector/face and resource utilizations for each cell can be computed/determined, which can be based on the SINR and/or capacity.

A determination can be made regarding whether the load is less than a threshold. A value of the threshold can be selected based on an identification/prediction of one or more applications (to be) executed by the UEs in the sector/face, one or more QoS or QoE requirements, etc.

If the load is determined to be less than the threshold, one or more outputs regarding resource utilization can be provided (e.g., spectrum and/or PRB utilization). The resource utilization will be used in the next time period, if the final time period is not reached, to calculate this cell's interference to its neighbors such that neighboring cells' SINR values can be calculated.

A determination can be made whether the variable directed to the time period has reached the terminal/final time period within the epoch. If so, the capacity/coverage can complete for the epoch. If the time period is not the final time period, the variable directed to the time period can be incremented to the next time period. Thereafter, another forecast can be obtained and the process can repeat If the load is determined not to be less than the threshold, a determination can be made whether the last-allocated carrier/cell y is at a predetermined subscription level (e.g., a maximum subscription level). If not, the last-allocated carrier/cell y can be incremented from a current subscription level to a next subscription level. The next subscription level can be less than or equal to the predetermined (e.g., maximum) subscription level. The next subscription level can include an increment in terms of wireless spectrum allocated to the last-allocated carrier/cell y. Thereafter, another load can be calculated as part of a loop to check/verify whether the incrementation is sufficient to satisfy the demand/load.

If the determination is that the last-allocated carrier/cell y is not at a predetermined subscription level, a determination can be made whether all of the potential carriers/cells are already deployed in the sector/face (e.g., the determination can correspond to a determination of whether y=$\Psi$).

If all potential carriers/cells are already deployed, an alert/warning, or other indication, can be generated. The alert/warning/indication can advise that the sector/face lacks resources (e.g., spectrum) in an amount that is sufficient to meet the demand/load (at least within the threshold/tolerance). In response to that alert/warning/indication, one or more actions can be taken, such as for example provisioning a new sector/face.

If all potential carriers/cells are not already deployed, the next cell/carrier can be deployed. For example, the new cell can be referenced as y+1, where y+1≤$\Psi$. The new cell y+1 can be allocated/deployed with a subscription level corresponding to a discrete/predetermined subscription level. For example, the new cell y+1 can be allocated a minimum subscription level (e.g., i=1). Thereafter, another coverage can be determined and the process can repeat.

According to some implementations, the coverage capacity estimation can include, for each bin (e.g., bins b=1 through b=M as set forth above) a determination/calculation of a signal strength from all cells in the bin in a DL direction can be obtained. For example, the signal strength can be specified in accordance with, or can be based on, a reference signal transmitted by infrastructure (e.g., a base station, a tower, or other network equipment) of a given cell, resulting in a reference signal receive power (RSRP) parameter for the cell for a given bin. In some embodiments, multiple instances of the reference signal can be provided, and one or more filtering (e.g., averaging) protocols can be used to reduce the impact of spurious results/signals.

For each bin, the cell with the greatest signal strength (e.g., the largest RSRP value) can be identified/selected. Further, for each bin, a respective DL Boolean flag can be selectively set or cleared. For example, a DL Boolean flag can be set if the greatest signal strength is less than a threshold; otherwise, the DL Boolean flag can be cleared. A value of the threshold can be selected to ensure that signal in the DL direction is of a sufficiently high quality. The value of the threshold can be based on experimentation, simulation, one or more requirements/specifications, etc.

A sensitivity of infrastructure (e.g., a receiver of a base station or a tower) for each cell can be identified. A UE transmission power limit (e.g., maximum) can be identified.

Subject to the UE transmission power limit, the power limit per PRB can also be identified/computed/determined.

Any gain (e.g., antenna gain) associated with the infrastructure, potentially on a per cell basis, can be identified. A fixed loss (including cable loss, body/car penetration loss, and shadowing margin) for each cell can be determined/identified. Interference margin (e.g., noise rise) can be determined/identified for each cell.

A maximum path loss ($PL_{max}$) budget in the UL direction (per PRB, per cell) can be determined/computed. For example, $PL_{max}$ can be computed as follows: $PL_{max} = (P_{tx\_max} + G) - (L_{fixed} + I_m + S_{infra})$, where $P_{tx\_max}$ represents the UE transmission power limit (per PRB), G represents the combined antenna gain of the cell and the UE, $L_{fixed}$ represents the fixed loss of the cell, $I_m$ represents the interference margin of the cell, and $S_{infra}$ represents the sensitivity of the infrastructure of the cell.

An UL Boolean flag can be selectively set or cleared for the UE. For example, if the value of $PL_{max}$ is greater than the actual pathloss between the cell and the UE, the UL Boolean flag can be set. Conversely, if the value of $PL_{max}$ is less than (or equal to) the actual pathloss between the cell and the UE, the UL Boolean flag can be cleared.

A determination can be made whether there is a hole in the coverage. For example, if the DL flag is set or the UL flag is set, that means that the network topology is incapable of providing service to the UE in at least one of the DL direction or the UL direction. Otherwise (e.g., if both the DL flag and the UL flag are cleared), tradeoffs can be made between the DL direction and UL direction to select a cell to provide service for the UE. For example, a cell that has the third best signal strength in the DL direction can be selected if that same cell has the best performance/coverage in the UL direction. The worst-case metric as between the DL direction and the UL direction can serve as the limit on the coverage that is provided to the UE.

According to some implementations, the coverage/capacity estimation can be used to calculate a SINR in a DL direction for a UE located within a given serving cell. Neighboring cells each can serve as a source of interference with respect to the DL communications between the serving cell and the UE. The SINR for the system in the DL direction can be calculated as follows: $SINR_{DL} = S/(I+N) = S/((\Sigma_k Q_k I_k) + N)$, where S is the signal that the UE receives from the serving cell (e.g., infrastructure), N is representative of background noise (frequently modeled as a random variable with a statistics-based distribution/profile), and I is representative of the collective interference generated by the neighboring cells. In particular, the collective interference I from the neighboring cells (where each neighboring cell can be generally denoted by an index 'k') can be represented as the summation over all k ($\Sigma_k$) of the fully loaded interference ($I_k$) contributed by the $k^{th}$ neighboring cell as scaled by a loading factor ($Q_k$) for the $k^{th}$ neighboring cell representative of the PRB utilization percentage for the $k^{th}$ neighboring cell. Although discussed with respect to two neighboring interferers/cells (e.g., k=2), any number k of interferers/interfering cells can be included.

According to some implementations, the coverage/capacity estimation can be used to calculate a SINR in an UL direction. The SINR for the system in the UL direction can be calculated as follows: $SINR_{UL} = S/(I+N)$, where S is the signal that the BS (Base Station) receives from the UE, N is representative of background noise (frequently modeled as a random variable with a statistics-based distribution/profile), and I is representative of the collective interference generated by the neighboring cells.

In terms of the calculation of the interference I in the $SINR_{UL}$ equation shown above, the interference $I_1$ and $I_2$ from the neighboring cells might not be constant due at least in part to the potential mobility of the UEs located therein. In this respect, considerations of open-loop fractional power control and probability modeling can be taken into account when modeling the interference I as part of the $SINR_{UL}$ calculation. To this end, for a defined serving cell 'n', the transmit power of a defined UE 'k' on each PRB can be given by: $P_{UE,tx}(n, k) = \min\{P_0 + \alpha * L_p(n, k), P_{UE,max}\}$, where $P_0$ and $\alpha$ are power control parameters, $L_p(n, k)$ is representative of the link loss between the $k^{th}$ UE and serving cell n, $P_{UE,max}$ is representative of the maximum transmission power allowed/enabled by the $k^{th}$ UE, and the min operator selects the minimum value of the argument contained within the brackets { }.

Thus, the received signal S at the serving cell n from the $k^{th}$ UE can be given by: $P_{rx}(n, k) = P_{UE,tx}(n, k) - L_p(n, k)$, and the interference from this $k^{th}$ UE to a defined neighbor cell 'm' can be given by: $P_{rx}(m, k) = P_{UE,tx}(n, k) - L_p(m, k)$, where $L_p(m, k)$ is representative of the link loss between the $k^{th}$ UE and cell m. It is noted that the UE contributes its own signal S in respect of UL communications and that same signal S can cause interference in respect of ongoing communications in the neighboring cells.

As described above, due to the potential mobility of UEs, it can be assumed that a given interfering UE being located in bin b of cell m has a probability denoted as $p_{b,m}$. Still further, it can be assumed that with respect to a full (e.g., 100%) loading factor that the actual resource (e.g., PRB) utilization in neighbor cell m will be some fraction $Q_m$ between 0% and 100%. With these assumptions in place, the (average) interference received by the serving cell n can be given as: $I(n) = \Sigma_{(m/=n)} Q_m \Sigma_{(b \in Cm)} p_{b,m} P_{rx}(n, b, m)$, where $P_{rx}(n, b, m)$ represents the received signal strength at the serving cell n when the interfering UE is located at bin b of cell m, and Cm is the set of bins b in cell m's coverage area. As shown in the above formula/equation for computing I(n), the loading factor $Q_m$ is applied over all m that is not equal (/=) to n, which is to say that a serving cell n does not experience interference with respect to itself (which otherwise would be the condition when n=m). The value of I(n) shown/computed above can be substituted for the value of I in the $SINR_{UL}$ calculation above.

In accordance with the foregoing description, each cell in a sector/face of a network can possess respective SINR profiles, one for each direction (e.g., DL and UL). An SINR profile can be denoted as a vector ($p_b$, $SINR_b$) where b is a bin index, and $p_b$ is a probabilistic weighting factor in accordance with the bin index.

Based on simulation and/or experimentation, the SINR profiles for a given cell j can be converted/mapped into a throughput $t_{b,j}$ for a cell j. The mapping can be based at least in part on an identification of a multiple-input and multiple-output (MIMO) protocol that is used (e.g., 2×2 transmit diversity, 2×2 open-loop spatial multiplexing, etc.). In turn, a capacity of a cell j, denoted as $Cap_j$, can be computed/calculated as: $Cap_j = (B_j - B_{over\_j})/\Sigma_{(b \in Cx)} p_{b,x}/t_{b,x}$, where $B_j$ is the total bandwidth of the $j^{th}$ cell, and $B_{over\_j}$ is bandwidth in the $j^{th}$ cell that is reserved for overhead (e.g., control channels/signaling). The loading factor within the $j^{th}$ cell, $Q_j$, can be calculated as: $Q_j = \min\{T_j/Cap_j, 100\%\}$, where $T_j$ is representative of the forecasted traffic demand/load for the $j^{th}$ cell. As the foregoing computation demonstrates, the loading factor $Q_j$ for the $j^{th}$ cell might not be allowed to exceed 100%, as there will be insufficient resources (e.g., spectrum) available within the $j^{th}$ cell to meet the forecasted load $T_j$ if that was not the case.

Within a given sector/face, a given load balancing rule/policy can provide for/favor a distribution of a total load of the sector/face, $T_{tot}$, amongst all cells j (from j=1 to j=Ψ) in (approximately) equal amounts, potentially subject to a constraint that a portion/fraction of the total load allocated to a given cell j cannot exceed the capacity of that cell j as set forth above.

In some embodiments, a load balancing rule/policy in a given sector/face can tend to favor a distribution of the total load of the sector/face such that the loading factors $Q_j$ (e.g., the ratios of the traffic allocated to the j cells relative to the respective capacities of the j cells) across the j cells are approximately equal over the sector/face. Stated slightly differently, such a load balancing rule/policy can allocate/distribute the load of a sector/face approximately in proportion to the respective capacities of each of the cells.

Irrespective of the particular load balancing rule/policy that is in place, and from the perspective of the sector/face, the total loading factor, $Q_{tot}$, can be calculated as: $Q_{tot}=T_{tot}/\Sigma_j Cap_j$. This value of the total loading factor, $Q_{tot}$, can form the basis for the value of the load.

For frequency division duplexed (FDD) communications, the deployed bandwidth for DL and UL directions can approximately be the same. Calculations for, e.g., cell capacity and loading/loading factors can be based on such an assumption.

According to some implementations, the coverage/capacity estimation can facilitate an allocation, provisioning, and utilization of other resources, such as time. For a time division duplexing (TDD) protocol, a single frequency band can be used for communications in both DL and UL directions. Accordingly, the coverage/capacity estimation can allocate or assign different timeslots as between the DL and UL directions to avoid conflict/contention within that frequency band. Allocations of timeslots for transmitting and/or receiving information or data are facilitated by the coverage/capacity estimation.

Load Balancing Section (1)

Load balancing (e.g., in connection with the load balancing function 204, the load balancing module 304, and so on) can facilitate improved UE throughput. For example, load balancing can employ a UE-centric point of view with regard to traffic distribution in a communication network. The load balancing can facilitate desirably controlling distribution of traffic associated with UEs among the cells of the communication network. Load balancing can determine UE traffic throughput for cells of the sector that satisfy a defined traffic throughput criterion relating to a harmonic mean of the UE traffic throughput for the cells that can maximize the harmonic mean, or at least satisfy a defined threshold minimum harmonic mean, in accordance with a defined distribution management criteria. Alternatively, or additionally, load balancing can determine the resource utilization for the cells that can satisfy a defined resource utilization criterion that can relate or correspond to the harmonic mean of the UE traffic throughput for the cell that can maximize the harmonic mean, or at least satisfy the defined threshold minimum harmonic mean.

In determining the UE traffic throughput and/or resource utilization of the cells, performance indicators (e.g., KPIs) can be tracked. The performance indicators can include, for example, respective resource utilization of the respective cells and/or respective capacities of the respective cells during a previous (e.g., last) time period (e.g., previous cycle), which can be an idle mode cycle having a first cycle rate and associated with UEs (e.g., 102) in idle mode or a connected-mode cycle having a second cycle rate and associated with UEs operating in a connected mode.

Based at least in part on the UE traffic throughput or resource utilization level associated with the cells, it can be determined whether to adjust (e.g., adaptively adjust) one or more characteristics (e.g., one or more parameters) associated with a cell(s) to facilitate adjusting distribution of UE traffic among the cells to achieve desirable load balancing of traffic. Load balancing can be achieved by controlling the respective parameters associated with the cells with regard to respective UEs that are in an idle mode (e.g., a sleep mode) or respective UEs that are in a connected mode (e.g., active communication mode or other active mode other than idle mode) to facilitate directing UEs and associated traffic to desired cells.

To facilitate desired (e.g., suitable, optimal, or acceptable) distribution of traffic associated with UEs, one or more desired algorithms or desired processes (e.g., load balancing or traffic distribution processes) that can enhance UE throughput for a sector, rather than with regard to the individual cells of the sector, can be employed (e.g., to achieve a more holistic or global objective). Thus, load balancing can, from the perspectives of the UEs, facilitate removing the cell boundaries and constraints from the communication network point of view. The load balancing can direct or steer traffic away from cells or carriers determined to be relatively poor performing cells or carriers to other cells or carriers determined to be relatively good cells or carriers.

In some cases, in order to desirably improve (e.g., optimize or enhance) overall UE throughput for a sector, a higher-capacity cell $C_i$ of the sector can be more heavily loaded with traffic associated with the UEs than lower-capacity cells of the sector.

Further, UEs in idle mode can be managed differently from UEs that are in connected mode. With respect to UEs in idle mode, one or more parameters can be controlled to facilitate desirable cell selection (e.g., reselection) by the UEs in idle mode. For example, if the cells in the sector have equal priority to one other, an offset parameter (e.g., a quality offset parameter) can be controlled. The offset parameter can be associated with a target cell and a serving cell, or a hysteresis parameter associated with a serving cell to facilitate controlling selection of a cell by UEs that are in idle mode.

In some implementations, cell reselection can be based at least in part on the respective rankings of a current cell and/or neighboring cells. A UE can determine a ranking for a cell based at least in part on ranking (R) values, wherein $R_s$ can be the ranking of a serving cell and $R_n$ can be a ranking of a neighbor cell (e.g., the n-th neighbor cell) that neighbors the serving cell. The UE can determine (e.g., calculate) the ranking of the serving cell ($R_s$) as follows: $R_s=Q_{meas,s}+Q_{hyst,s}$, wherein $Q_{meas,s}$ can be the cell received quality of the signal of the serving cell as measured by the UE, and $Q_{hyst,s}$ can be the hysteresis parameter associated with the serving cell. The hysteresis parameter can be set to a desired value to facilitate discouraging a UE from moving (e.g., bouncing) back and forth between respective cells (e.g., serving cell and another cell) in response to fluctuations in respective signal levels that may occur. The UE can determine (e.g., calculate) the ranking of the neighbor cell ($R_n$) as follows: $R_n=Q_{meas,n}-Q_{offset\_s,n}$, wherein $Q_{meas,n}$ can be the cell received quality of the signal of the neighbor cell (e.g., the n-th neighbor cell) as measured by the UE, and $Q_{offset\_s,n}$ can be an offset parameter associated with the serving cell and the neighbor cell (e.g., the n-th neighbor cell) that is to be applied with respect to the neighbor cell.

The UE can reselect from a serving cell to a highest-ranked cell based at least in part on the respective rankings of the serving cell and the neighbor cells, when the highest-ranked cell is higher ranked than the serving cell for at least a defined period of time.

For idle mode load balancing control, if the neighbor cell is the target cell, the offset parameter can be decreased to facilitate improving (e.g., increasing) the ranking of the target cell relative to the ranking of the serving cell and/or other cells. Alternatively, if desired, the offset parameter can be increased to facilitate degrading (e.g., reducing) the ranking of the target cell relative to the ranking of the serving cell and/or other cells.

In some implementations, to facilitate idle mode load balancing control, if the neighbor cell is the source cell, the offset parameter can be increased to facilitate degrading (e.g., reducing) the ranking of the source cell relative to the ranking of the target cell and/or other cells. Alternatively, the offset parameter can be decreased to facilitate improving (e.g., increasing) the ranking of the source cell and/or other cells relative to the ranking of the target cell.

In some sectors, cells of the sector can have non-equal priorities with respect to each other. In this case, one or more parameters (e.g., a defined high threshold value (e.g., threshXhigh) associated with a target cell, a defined low threshold value (e.g., threshXlow) associated with a target cell, or a defined low threshold serving cell value (e.g., threshServingLow) associated with a serving cell) can be controlled to facilitate controlling selection.

UEs can respectively measure the respective qualities of the respective signals received from respective cells and can select (e.g., reselect) a target cell or source cell based at least in part on the measurement of the signal quality of the target cell (e.g., TargetCellMeas) and/or the measurement of the signal quality of the serving cell (e.g., ServingCellMeas), and based at least in part on the applicable threshold value(s) (e.g., applicable reselection threshold value(s)) and respective priorities of the respective cells.

For example, a UE can measure the signal quality of target cell (or source cell), compare the signal quality to an applicable threshold value(s) (e.g., threshXhigh, threshXlow, and/or threshServingLow) to facilitate determining whether cell reselection is to be performed. Further, the UE can determine whether cell reselection is to be performed. For example, the UE can select or reselect to the higher priority cell (e.g., from the lower priority cell) if the UE determines that the signal quality of the target cell with respect to the UE is greater than the defined high threshold value (e.g., threshXhigh) associated with the target cell.

In some implementations, the UE can select (or reselect) to the lower priority cell (e.g., from the higher priority cell) if the UE determines that the signal quality of the target cell with respect to the UE is greater than the defined low threshold value (e.g., threshXlow) associated with the target cell and the signal quality of the serving cell (e.g., ServingCellMeas) with respect to the UE is less than the defined low threshold serving cell value (e.g., threshServingLow) associated with the serving cell.

For cells with non-equal priorities, respective threshold values (e.g., threshXhigh, threshXlow, or threshServingLow) associated with respective cells of respective priorities can be determined, set, and/or adjusted (e.g., adaptively adjusted), which can facilitate controlling reselection of cells by UEs and steering UEs and associated traffic to desired cells in the sector, in accordance with the defined distribution management criteria. This can result in more UEs reselecting to the target cell as the higher priority cell.

To steer UEs away from a source cell and toward a target cell, if the source cell has a higher priority than the target cell, the defined low threshold value (e.g., threshXlow) associated with the target cell can be decreased and/or the defined low threshold serving cell value (e.g., threshServingLow) associated with the source cell can be increased. This can result in more UEs reselecting to the target cell as a lower priority cell. If a target cell has a lower priority than the source cell, the defined high threshold value (e.g., threshXhigh) associated with the target cell can be increased to facilitate steering UEs towards connecting to or maintaining a connection with the target cell. If the target cell has a higher priority than the source cell, the defined low threshold value (e.g., threshXlow) associated with the target cell can be increased and/or the defined low threshold serving cell value (e.g., threshServingLow) associated with the source cell can be decreased.

With respect to connected mode, UE-level control can involve measurement and signaling associated with the UEs that are in a connected mode. For example, all or a desired portion of such UEs that are in a connected mode can be directed to perform measurements of respective signal strengths and/or respective signal qualities of respective cells through handover events and to report the measurements of signal strengths and/or signal qualities. For example, at least a portion of the UEs that are to measure the respective signal strength (e.g., RSRP and/or the respective signal qualities (e.g., reference signal received quality (RSRQ)) of other cells can use measurement gaps, and can measure the respective signal strengths and/or the respective signal qualities of the other cells using the measurement gaps. A measurement gap refers to the period of time during which the UE has to stop communicating (e.g., transmitting, receiving) to perform the measurements.

According to some implementations, a handover event can be triggered when a signal strength level of a serving cell, with respect to a UE is functionally lower (e.g., worse) than a first defined threshold level, and the signal strength level of a neighbor cell with respect to the UE is functionally higher (e.g., better) than a second defined threshold level. Accordingly, one or more of the parameters can be controlled in order to facilitate controlling (e.g., adaptively controlling) handover events (e.g., inter-frequency handover events) and to facilitate controlling (e.g., adaptively controlling) steering UEs to or from a cell (e.g., a source cell) from or to another cell (e.g., a neighbor cell) in the sector. For example, if the serving cell is the source cell, the first defined threshold level and/or the second defined threshold level can be decreased to steer UEs away from connecting to the source cell and towards connecting to a neighbor cell to facilitate desirably distributing traffic among the cells of the sector (e.g., when doing so is in accordance with the defined distribution management criteria). Alternatively, if the serving cell is the source cell, the first defined threshold level and/or the second defined threshold level can be increased to steer UEs away toward connecting, or maintaining their connection, to the source cell and away from connecting to a neighbor cell to facilitate desirably distributing traffic among the cells of the sector (e.g., when doing so is in accordance with the defined distribution management criteria). If not enough qualified (e.g., candidate) UEs are reporting measurements of the respective signal strengths and/or respective signal qualities associated with respective cells, one or more handover parameters can be modified to facilitate increasing the number of qualified UEs that are reporting measurements of the respective signal strengths and/or respective signal qualities associated with the respective cells.

To determine whether a UE should be moved from a source cell to a target cell can be based at least in part on the results of analyzing the respective signal strengths and/or the respective signal qualities of the respective cells.

The load balancing and distribution of traffic as discussed herein can be performed concurrently (e.g., in parallel) with respect to UEs in the idle mode and UEs in a connected mode. With regard to UEs in idle mode, the operations of the load balancing process can be performed every idle-mode cycle, which can occur at a first cycle rate (e.g., cycle occurs every 5 minutes, 10 minutes, 15 minutes, or 20 minutes, or at another desired cycle rate). With regard to UEs operating in a connected mode, the operations of the load balancing process can be performed every connected-mode cycle, which can occur at a second cycle rate (e.g., cycle occurs every 5 seconds, 10 seconds, 15 seconds, or 20 seconds, or at another desired cycle rate). The first cycle rate typically can be slower or longer (e.g., significantly longer) than the second cycle rate.

For the load balancing process, performance indicators (e.g., KPIs) of the cells can be tracked. The tracked performance indicator can include respective resource utilization of the respective cells, respective cell capacities of the respective cells, the amount of traffic being communicated to or from respective UEs in the sector, and others. The amount (e.g., magnitude) of traffic that is to be moved from one cell or carrier to another cell or carrier of the sector can be based at least in part on the information relating to the performance indicators. The information relating to the performance indicators can be information that was obtained during or in connection with, or relating to, a previous (e.g., last) cycle (e.g., a previous cycle associated with UEs in idle mode, or a previous cycle associated with UEs operating in a connected mode).

One or more parameters, such as, for example, cell (re)selection parameters, can be adjusted (e.g., adaptively adjusted) in a direction (e.g., increasing direction, or decreasing direction) to facilitate steering or causing more UEs to connect to the target cell or less UEs to connect to the source cell, based at least in part on the results of analyzing the performance indicators associated with the previous cycle.

One or more UEs that are operating in a connected mode (e.g., one or more candidate UEs) can be commanded (e.g., via an instruction sent to the candidate UEs) to measure their respective signal strengths (e.g., RSRP) and/or respective signal qualities (e.g., RSRQ) with regard to respective target cells of the sector. A determination or estimate can be performed with respect to the respective UE traffic throughput and respective efficiency of the respective candidate UEs in respective target cells, based at least in part on the results of analyzing the respective signal strengths (e.g., RSRP) and/or respective signal qualities (e.g., RSRQ) of the respective candidate UEs with respect to the respective target cells of the sector. It can be determined (e.g., decided) which UEs are to be moved to the one or more target cells, based at least in part on the respective UE traffic throughput and the respective efficiency of the respective candidate UEs with regard to the respective target cells.

According to some implementations, the load balancing can execute or can facilitate executing an inter-frequency handover to hand over (e.g., move) one or more of the candidate UEs to one or more of the target cells, with which the one or more candidate UEs can connect, to facilitate desirable load balancing of traffic among the cells of the sector.

During a cycle (e.g., $cycle_n$), respective resource utilization (e.g., $\rho_n$) of respective cells or carriers in the sector can be monitored or determined based at least in part on respective amounts of traffic distributed to the respective cells and respective capacities of the respective cells during the cycle. A desired (e.g., optimal, maximal, suitable, or acceptable) resource utilization (e.g., $\rho_{opt,n}$) of the cells can also be determined. For example, the desired resource utilization can be one that satisfies the defined traffic throughput criterion, which can relate to, for example, the harmonic mean of the UE traffic throughput for the cells of the sector that can maximize the harmonic mean or at least satisfy a defined threshold minimum harmonic mean.

Further, a delta resource utilization (e.g., $\Delta\rho$) associated with the cells or carriers of the sector can be determined as a function of the desired resource utilization (e.g., optimal, maximal, suitable, or acceptable) and the respective resource utilization levels of the respective cells or carriers in the sector. For example, the delta resource utilization can be calculated as being equal to the desired resource utilization minus the resource utilization level of the respective cells or carriers in the sector.

A determination can be made whether the delta resource utilization (e.g., $\Delta\rho_n$) satisfies a first defined threshold value (e.g., $T_0$), wherein the first defined threshold value can relate to or indicate a resource utilization level of the cells or carriers that is close enough to the desired resource utilization (e.g., $\rho_{opt,n}$) such that performing a target action (e.g., parameter adjustment, interfrequency handover, and/or other load balancing operation) is not desired during this cycle. In some implementations, the absolute value of the delta resource utilization (e.g. $|\Delta\rho_n|$) can be determined or calculated, and the absolute value of the delta resource utilization (e.g., $|\Delta\rho_n|$) can be compared to the first defined threshold value (e.g., $T_0$) to determine whether the delta resource utilization satisfies (e.g., exceeds) the first defined threshold value (e.g., determine whether $|\Delta\rho_n|>T_0$).

The first defined threshold value can comprise a value range that can range from the positive value to a corresponding negative value (e.g., $\pm T_0$). In such other implementations, the delta resource utilization (e.g., $\Delta\rho_n$) can be compared to the first defined threshold value range (e.g., $\pm T_0$) to determine whether the delta resource utilization satisfies the first defined threshold value range (e.g., exceeds the positive value or is less than the negative value of the first defined threshold value range).

If the absolute value of the delta resource utilization (or the delta resource utilization) does not satisfy the first defined threshold value (or value range), it can be determined that no target action is to be performed in connection with the UEs and/or cells or carriers during this cycle. Alternatively, if the absolute value of the delta resource utilization (or the delta resource utilization) satisfies the first defined threshold value (or value range), it can be determined whether the potential target action of this cycle is the same as the potential target action of the previous cycle.

For example, an evaluation or comparison or a sign (e.g., mathematical sign, such as + or −) of the delta resource utilization (e.g., $\Delta\rho_n$) of this cycle and the sign of the delta resource utilization (e.g., $\Delta\rho_{n-1}$) of the last cycle. Further, it can be determined whether the sign of the delta resource utilization (e.g., $\Delta\rho_n$) of this cycle is the same as the sign of the delta resource utilization (e.g., $\Delta\rho_{n-1}$) of the last cycle (e.g., $\text{sign}(\Delta\rho_n)=\text{sign}(\Delta\rho_{n-1})$), based at least in part on the result of the evaluation of the respective signs. If it is determined that the potential target action of this cycle is not the same as the potential target action of the previous cycle, it can be determined that no target action is to be performed during this cycle. Alternatively, if the sign of the delta resource utilization (e.g., $\Delta\rho_n$) of this cycle is not the same as the sign of the delta resource utilization (e.g., $\Delta\rho_{n-1}$) of the previous cycle, it can be determined that the potential target action of this cycle is not the same as the potential target action of the last cycle. This can indicate some volatility in delta resource utilizations over the current and previous cycles and it can be determined that no target action is to be performed with regard to this cycle, but to wait for a clearer signal that a target action should be taken and what the target action should be.

According to some implementations, if the sign of the delta resource utilization (e.g., $\Delta\rho_n$) of this cycle is the same as the sign of the delta resource utilization (e.g., $\Delta\rho_{n-1}$) of the previous cycle it can be determined that a target action potentially can still be performed, if other conditions are satisfied in accordance with the defined distribution management criteria. For example, it can be determined that more aggressive action (e.g., adjustment of parameters) potentially can be desirable. In another example, it can be determined whether a delta value satisfies a second defined threshold value (e.g., $T_1$), wherein the delta value as a function of the delta resource utilization (e.g., $\Delta\rho_n$) of this cycle and the delta resource utilization (e.g., $\Delta\rho_{n-1}$) of the last cycle. If it is determined that the delta value is less than the second defined threshold value (e.g., $T_1$), the delta value can be calculated as being equal to the delta resource utilization (e.g., $\Delta\rho_{n-1}$) of the last cycle minus the delta resource utilization (e.g., $\Delta\rho_n$) of the current cycle. The second defined threshold value can relate to or indicate whether the delta resource utilization (e.g., $\Delta\rho_n$) associated with this cycle is desirably (e.g., sufficiently) close enough to the delta resource utilization (e.g., $\Delta\rho_{n-1}$) associated with the previous cycle such that performing a target action is desired during this cycle.

In certain implementations, the second defined threshold value (e.g., $T_1$) can be a positive value. The absolute value of the delta resource utilization (e.g., $|\Delta\rho_{n-1}|$) associated with the previous cycle and the absolute value of the delta resource utilization (e.g., $|\Delta\rho_n|$) associated with this cycle can be determined. Further, the delta value can be determined as a function of (e.g., as equal to) the difference between the absolute value of the delta resource utilization associated with the previous cycle and the absolute value of the delta resource utilization associated with this cycle (e.g., delta value=$|\Delta\rho_{n-1}|-|\Delta\rho_n|<T_1$). For example, the delta value can be compared to the second defined threshold value to determine whether the delta value satisfies (e.g., is less than) the second defined threshold value.

If the delta value does not satisfy the second defined threshold value, it can be determined that no target action is to be performed during this cycle. The process can proceed to the next cycle (e.g., idle-mode cycle or connected-mode cycle, whichever occurs next), and further load balancing can be performed as discussed herein. Alternatively, if the delta value satisfies the second defined threshold value, a target action can be performed with respect to this cycle.

With respect to UEs that are in idle mode in connection with cells of equal priority in the sector, the target action can comprise, for example, adjusting one or more parameters to facilitate adjusting a ranking of a cell to facilitate adjusting reselection of cells by the UEs. Further, with respect to UEs in connected mode, inter-frequency load balancing (e.g., inter-frequency hand over) can be performed to facilitate steering one or more UEs to another cell (e.g., a desired target cell(s)), and/or adjusting one or more parameters to facilitate steering UEs to or from a cell (e.g., a source cell) in the sector. The one or more parameters can comprise, for example, a first defined threshold value (e.g., a defined threshold value associated with a serving cell), a hysteresis parameter associated with the serving cell, or a second defined threshold value (e.g., a defined threshold value associated with a neighbor cell).

The thresholds (e.g., $T_0$ and $T_1$) employed can be determined to facilitate controlling sensitivity of the defined distribution management process and mitigating undue or inefficient adjustments to parameters that can potentially result in inefficient management of traffic distribution and/or eliminate a potential "ping-pong" effect, wherein, during one cycle, a parameter(s) is adjusted in one direction (e.g., to decrease a parameter value), and during another (e.g., next) cycle, the parameter(s) is again adjusted in an opposite direction (e.g., to increase a parameter value).

Load Balancing Section (2)

Load balancing (e.g., in connection with the load balancing function 204, the load balancing module 304, and so on) can facilitate adaptive load balancing in accordance with some implementations. In various embodiments described herein, the adaptive load balancing processes are cell state adaptive load balancing processes. Certain descriptions of these processes focus only on cell loading conditions. On the surface, this may appear to be agnostic to channel signal quality, hence running the risk of connecting UEs to cells providing poorer signal quality (which in turn may adversely affect spectral efficiency and throughput). However, adaptation to achieve optimal signal quality is built into the algorithmic and implementation frameworks, thus yielding concurrent optimality with regard to cell load states as well as signal quality.

Some examples (focusing on the respective optimization criteria and implementation) are directed to the following three cell selection processes: (1) Equal Utilization (sometimes referred to herein as "EqUtil") process; (2) Maximum Average Throughput (sometimes referred to herein as "MaxAvgTpt") process; and (3) Maximum Minimum Throughput (sometimes referred to herein as "MaxMinTpt") process. Further examples extend the load balancing suite to address the coexistence of carrier-aggregated and non-carrier-aggregated components in the total traffic volume.

As described herein, a set of load balancing processes is provided. The processes include: EqUtil (which can aim for equal physical resource block (PRB) utilization); MaxAvgTpt (which can aim for a maximized average user throughput); and MaxMinTpt (which can aim for a maximized minimum user throughput). One or more of these processes can be adapted for use in a near real-time Radio Resource Controller (RRC) environment (such as for management of the Radio Access Network (RAN) resources).

Various embodiments can provide for minimizing the spectrum requirement (and capital investment) needed to carry the offered wireless traffic while meeting the required customer experience KPIs. This can be accomplished by optimal load balancing across available cells and/or sector.

As it relates to the EqUtil objective, the goal is to maintain the physical resource block utilization identical (or as close to identical as possible) for all cells in the controlled group of cells. Each cell within the controlled group computes, stores and reports (e.g., upon query or following a periodic schedule), the following metric "A" averaged over the preceding window of m Transmission Time Intervals, or TTI's (the value of m can be optimally selected based on implementation considerations): The average number of allocated PRB's (per TTI) divided by the total number of PRB's available to carry payload traffic. In this embodiment, the above information (e.g., metric A) is collected and processed by the controller at each instance of load balancing decision. In a proactive variant, the cell d that currently reports the smallest value of metric A (distinguished as $A_d$) is selected by the controller as the destination to admit each new transaction. In a reactive variant, multiple ongoing calls can be migrated, each respectively, from the source cell s determined by the controller as currently reporting the largest value of metric A (distinguished as $A_s$) to the destination cell d determined by the controller as currently reporting the smallest value (distinguished as $A_d$). Further, in this embodiment the above cell selection policy drives the system towards maintaining equal cell utilization across the group of cells being load balanced (within the limits of the coarse granularity imputed by the non-fluid arrivals and departures of individual transactions).

The following relates to an embodiment directed to load balancing based on the MaxAvgTpt objective. In this embodiment, the goal is to maximize the volume weighted average UE throughput (T) across the controlled group of cells. In this embodiment, each cell i within the controlled group computes, stores and reports (e.g., upon query or following a periodic schedule), both the capacity and carried load metrics averaged over the preceding window of m TTI's as follows (the value of m can be optimally selected based on implementation considerations): A'. The average number of allocated PRB's per TTI; B'. The average throughput that was delivered by an allocated PRB in bits/TTI (obtainable, for example, by dividing the total number of bits transmitted over the window by the total number of allocated PRB's summed over the window); C'. The average carried load $J_i$ in bits/TTI (obtainable, for example, by dividing the total number of bits transmitted over the window by m); D'. Product of B' with the total number of PRB's available to carry payload (estimates cell capacity $C_i$ in bits/TTI).

In this embodiment, at each instance of load balancing decision, the controller queries and obtains estimates of $J_i$(metric C') and $C_i$(metric D') from each cell i. Summing these yields estimates of the total load/and system capacity C, which can be applied to compute the optimum target loads $\{\tilde{J}_i\}$, all units being in bits/TTI. In the proactive variant, the cell d that corresponds to the smallest (most negative) value of $J_d - \tilde{J}_d$ currently is selected by the controller as the destination to admit each new transaction. In the reactive variant, multiple ongoing calls can be migrated, each respectively, from the source cell s determined by the controller such that $J_s - \tilde{J}_s$ is currently the largest (most positive) to the destination cell d determined by the controller such that $J_d - \tilde{J}_d$ is currently the smallest (most negative). Further, in this embodiment, the above cell selection policy drives the system towards maximizing the average UE throughput across the controlled group (within the limits of the coarse granularity imputed by the non-fluid arrivals and departures of individual data transactions).

Reference will now be made to certain details of an embodiment directed to load balancing based on the MaxMinTpt objective. In this embodiment, the goal is motivated by fairness/parity considerations. That is, the goal is to maximize the minimum among the average UE throughputs experienced across the set of cells under control. Under statistically stationary loading conditions, the MaxMinTpt objective would drive the controlled group towards the following equilibrium state: The set of cells gets partitioned into two subsets S and $\tilde{S}$, such that: 1) The highest capacity of any cell in subset $\tilde{S}$ is strictly less than the smallest capacity of any cell in subset S; 2) The entire traffic volume is carried by cells in subset S, such that every cell in S has the same slack capacity (UE throughput)–cells in subset $\tilde{S}$ do not carry traffic; 3) S is the largest such subset which can meet criteria 1 and 2 above (e.g., migration of any additional cell from S to $\tilde{S}$ will result in infeasibility (negative load allocations)).

Still referring to the embodiment directed to load balancing based on the MaxMinTpt objective, certain details regarding a cell selection implementation are provided. In particular, in this embodiment, each cell within the controlled group computes, stores, and reports (e.g., upon query or following a periodic schedule), the following metrics averaged over the preceding window of m TTI's (the value of m can be optimally selected based on implementation considerations): A". The average number of unallocated PRB's (over the window of m TTI's); B". The average throughput that was delivered by an allocated PRB in bits/TTI (obtainable, for example, by dividing the total number of bits transmitted over the window by the total number of allocated PRB's summed over the window); C". The product of metrics A" and B" above (estimates the slack capacity at the cell in bits/TTI). In this embodiment, at each instance of load balancing decision, the controller queries and obtains metric C" from each cell.

In the proactive variant, the cell d that currently reports the largest value of metric C" (distinguished as $C_d$") is selected by the controller as the destination to admit each new transaction. In the reactive variant, multiple ongoing calls can be migrated, each respectively, from the source cell s determined by the controller as currently reporting the smallest value of metric C" (distinguished as $C_s$") to the destination cell d determined by the controller as currently reporting the largest value of metric C" (distinguished as $C_d$"). Further, in this embodiment, the above cell selection policy drives the system to the equilibrium state identified above (within the limits of the coarse granularity imputed by the non-fluid arrivals and departures of individual data transactions). In this embodiment, while the goal is to optimize UE throughput, a costly direct measurement of the latter is averted (though, in another example, the implementation sequence can utilize UE throughput measurements instead (or in addition)).

Reference will now be made to a reactive implementation embodiment in the context of adaptivity to channel signal quality. In this embodiment, each UE in connected mode can monitor the downlink pilot SINR from each cell i in the controlled group, and report to the controller, on an ongoing basis. This metric can be mapped to a corresponding achievable per-PRB throughput $Q_i$, which has the de-facto significance of being an indicator of the channel quality as perceived by the UE in reference to cell i. Each instance of reactive load balancing decision involves a given pair of source and destination cells, and multiple ongoing UE transactions. The plurality of candidate transactions can be rank ordered by the channel quality indicators in different ways. Examples of such rank ordering are: (a) per the achievable PRB throughput at the destination, $Q_d$, and (b) per the difference between the achievable PRB throughputs at destination and source, $Q_d - Q_s$. The actual UE transactions (e.g., calls) migrated from source to destination can be selected per the above ranking in decreasing order.

Reference will now be made to a proactive implementation embodiment in the context of adaptivity to channel signal quality. In this embodiment, each instance of proactive load balancing decision involves a single incoming call, and multiple choices of target cells. In various embodiments, the cell ranking metric employed (in the proactive implementations) can be modulated by the channel quality indicators for the UE in question, in making the cell selection. While there are a number of options to achieve this goal, the following are some illustrative examples (a being a suitably chosen positive constant): EqUtil: Select the cell i with minimum value of $\{\text{metric } A_i/Q_i^\alpha\}$; MaxAvgTpt: Select the cell i with minimum value of $\{J_i - \tilde{J}_i - \alpha Q_i\}$; MaxMinTpt: Select the cell i with maximum value of $\{\text{metric } C_i'' \times Q_i^\alpha\}$.

Reference will now be made to a carrier aggregation embodiment. In this example, the system supports the coexistence of carrier aggregated (CA) and non-aggregated (NCA) transactions. Each non-aggregated UE transaction is connected to a single cell per some load balancing rule. Each carrier aggregated UE is connected to multiple cells concurrently (a CA group).

A carrier aggregated transaction self-balances its load across the CA group to which it is connected. The payload of each transaction is split among the cells in the CA group, with the contribution from cell i being proportional to the UE sub-throughput received from cell i. Hence the CA load share of each cell in a CA group is proportional to the UE sub-throughput provided as well.

Each CA group, in general, forms a sub-group of a controlled (load balanced) group of cells. The simplest scenario is where the entire controlled group forms a single CA group. In this simplest scenario, explicit load balancing is required only for the non-CA traffic load (while taking the self-balancing CA background traffic into account) across the N cells in the controlled group. In another scenario (e.g., the controlled group subdivided into M>1 CA groups) load balancing applies to the non-CA traffic (across the total of N cells) as well as to the CA traffic (across the MCA groups in the controlled group).

Performance Calculation Section

Performance calculation (e.g., in connection with the performance calculation function 206, the performance calculation module 306, and so on) can facilitate allocating or dimensioning resources associated with a communication network in accordance with priority tiers and/or classes of service.

Profiles for each cell of the network or system can be generated (e.g., in a similar manner as the profiles generated with respect to the coverage/capacity estimation as discussed herein). A range of possible spectral efficiencies that a random UE can experience, with reference to a particular cell j, can be segmented into a plurality of bins $m_j$. The spectral efficiency in bin u with reference to cell j can be represented by the bin-specific spectral efficiency parameter $\theta_{j,u}$. Aspects of past records (e.g., past drive test records) can drive values for $p_{j,u}$, which denotes the probability that a random UE attached to cell j will find itself in bin u.

Further, forecasts of traffic in the network can be generated and can be based on traffic projections at a given level of granularity. In some embodiments, the generation of the forecasts can take into consideration a type of traffic (e.g., voice and video), and elasticity in terms of data volume at different priority levels/classes. The profile and the forecasts of traffic can be utilized to provide/generate dimensioned resource allocations.

For purposes of explanation, a particular sector/face of a system initially has a total of $\Psi$ carriers or cells, where each of the carriers/cells is arranged in a predetermined order of deployment, and each of the carriers/cells is indexed as j=1, ..., $\Psi$. Further, the cells corresponding to j=1 through j=$\Psi$-1 are at their highest subscription level, and cell j=$\Psi$ can be at any one of its intermediate subscription levels (e.g., a subscription level that is less than, or equal to, a subscription capacity maximum for the cell). Still further, each carrier/cell j can initially have a provisioned spectrum $B_j$. Moreover, each carrier/cell j can have an associated spectral efficiency. The average spectral efficiency for the $j^{th}$ carrier/cell, denoted as $\theta_j$, can be calculated as follows: $\theta_j = [\Sigma_u(p_{j,u}/\theta_{j,u})]^-$, where $p_{j,u}$ denotes the probability of a communication session of a UE falling within an SINR bin u of cell j for an arbitrary number of bins m (e.g., u=0, ..., m-1), and $\theta_{j,u}$ denotes the spectral efficiency in bin u ($\{p_{j,u}, \theta_{j,u}\}$ are assumed to be available beforehand from drive test data).

In the description that follows, it is assumed that there are two guaranteed traffic classes (corresponding to k=0 and k=1), where the guaranteed traffic classes correspond to: (1) conversational voice (k=0), e.g., voice over LTE protocol [VoLTE]supported at QCI priority level 1 in LTE networks, and (2) conversational video (k=1), e.g., live streaming supported at QCI priority level 2 in LTE networks. Still further, it is assumed that there are four elastic data classes (corresponding to k=2 through k=5). The elastic data classes (k=2 through k=5) each can correspond to/include any combination of buffered video, email, text (documents, chat), file transfers, peer-to-peer file sharing, progressive video, and interactive gaming. These assumptions can be relaxed in a given embodiment to provide for more or less guaranteed traffic classes and/or more or less elastic data classes.

With the foregoing assumptions in place, a cell capacity for each of the $\Psi$ cells, $C_j$, j=1, ..., $\Psi$, can be computed. The capacity of the $j^{th}$ cell, $C_j$, can be computed as the product of the spectrum configured for the cell ($B_j$) and the spectral efficiency of the cell ($\theta_j$), e.g.: $C_j = B_j * \theta_j$. A determination can be made whether the traffic utilization associated with the guaranteed traffic classes (e.g., conversational voice (k=0) and conversational video (k=1) in accordance with the foregoing assumptions) exceeds a threshold $R_{max}$, where $R_{max}$ represents the maximum fraction of the available capacity allowed for the guaranteed traffic.

If the guaranteed traffic utilization does not exceed the threshold, erlangs associated with the guaranteed traffic classes can be apportioned. For example, and in accordance with projections/estimates regarding demand, $E_0$ can denote the erlangs for conversational voice (k=0) and $E_1$ can denote the erlangs for conversational video (k=1). The elastic data volume of the sector/face (denoted as EDV) can be apportioned to each of the cells j in an amount $EDV_j$ that is in proportion to the capacity of the cell ($C_j$) relative to the total capacity ($\Sigma_q C_q$), e.g.: $EDV_j = EDV*(C_j)/(\Sigma_q C_q)$, where the summation operator ($\Sigma$) is applied for all cells 'q' from 1 through $\Psi$. In some embodiments, the apportioning for $E_0$ and $E_1$ can use the same, or a similar, scaling as set forth above for the elastic data volume.

Then, the elastic data capacity ($D_j$) for elastic data traffic (e.g., k=2 through k=5) for each of the j cells can be computed as the difference between the capacity of the cell ($C_j$) and the capacity allocated to the guaranteed traffic classes (k=0 and k=1). In other words, the elastic data capacity can be computed as: $D_j = C_j - ([E_{j,0}*b_0] + [E_{j,1}*b_1])$, where $E_{j,0}$ denotes the apportioned erlangs for the $j^{th}$ cell associated with the first guaranteed traffic class (e.g., k=0), $E_{j,1}$ denotes the erlangs for the $j^{th}$ cell associated with the second guaranteed traffic class (e.g., k=1), $b_0$ denotes the bandwidth occupied by each session of the first guaranteed traffic class, and $b_1$ denotes the bandwidth occupied by each session of the second guaranteed traffic class.

Thereafter, analytical modeling and/or simulation can be performed based on the elastic data capacity computed in order to determine/compute throughput $T_{j,k}$ for each cell j and each of the elastic data classes (k=2 through k=5 in this example).

The choice of whether to perform analytical modeling or simulation can be based on one or more considerations. An apportioning of traffic volumes among the cells (e.g., load balancing) can be common to both analytical modeling and simulation, and both can be used to compute performance (e.g., throughput) in an individual cell (post load balancing).

A determination can be made whether the throughputs computed all satisfy a threshold, denoted as $S_{min}(k)$. For example, each of the classes (k=2 through k=5) can have its own threshold (e.g., $S_{min,k}$). If the determination is answered in the affirmative, the count of cells can be updated to correspond to the last count of cells. As described above, initially the count of cells can be set equal to $\Psi$; however, the performance calculation can result in a count that is different from $\Psi$. The spectrum allocated to a given cell (e.g., the cell corresponding to j=$\Psi$) can be updated to correspond to the last spectrum allocation to that cell (e.g., can result in a new/different spectrum allocation).

If the determination whether the throughputs computed all satisfy a threshold is answered in the negative, or if is determined that the guaranteed traffic utilization do exceed the threshold (Rmax), a determination can be made whether the last cell (e.g., the cell corresponding to j=$\Psi$) is at a threshold (e.g., maximal) spectrum allocation. If so, a new cell (e.g., a cell corresponding to j=$\Psi$+1) can be deployed at a predetermined (e.g., a minimum, discrete) spectrum level. Thereafter, the process can return to computing cell capacities again to facilitate additional (e.g., continued or periodic) executions of the performance calculation and the process can continue. If not, the spectrum associated with the last cell (e.g., j=$\Psi$) can be increased (e.g., incremented) to the next available level and the process can return to computing cell capacities again and the process can continue.

According to some implementations, according to the performance calculation, parameters/variables can be initialized. For example, the state vector ($n_{k,u}$) can be initialized to zero and a simulation time ($sim_t$) can be set equal to zero. Furthermore, the spectrum share available for elastic data, BD, is set equal to B, the total spectrum configured at the cell.

Further, a sojourn time interval ($\tau$) can be computed. The sojourn time interval ($\tau$) can be modeled as an exponentially distributed random variable, in accordance with a state exit rate that is equal to the sum of arrival and departure rates. At the start of simulation (or following an epoch when the system becomes empty) there are no pending transactions (e.g., $n_{k,u}=0 \ \forall k,u$); hence the net departure rate is 0. The exponentially distributed sojourn time $\tau$ in this situation is determined as the sum of only the (known) arrival rates from all traffic classes. Transaction arrival rates for voice and video (k=0,1) equal the respective projected Erlangs divided by the respective holding times, and those for each of the elastic data classes (k=2, . . . , 5) equals the respective projected traffic volume divided by an assumed payload size per transaction x (a specified system constant, e.g., x=1 Mbits). In the more general situation where there are pending transactions, computation of the non-zero departure rates to be included is state-dependent.

The simulation time ($sim_t$) can be set equal to the sum of the current or last value of the simulation time ($sim_t$) and the sojourn interval ($\tau$)–advancement of the simulated virtual time. A specific coarse event (e.g., an arrival or a departure) can be differentiated, via pseudo-random coin toss based on the logic that the probability of that event (arrival/departure) equals the exit rate into that event (from the preceding state) divided by the total exit rate from the preceding state. For example, at the top level of hierarchy, the average sojourn time equals 1/(arrival rate+departure rate), prob(next event being arrival)=arrival rate/(arrival rate+departure rate) and prob(next event being departure)=departure rate/(arrival rate+departure rate). Note that finer-grain differentiation among guaranteed or elastic arrivals and guaranteed or elastic class departures is again carried out based on pseudo-random coin tosses driven by ratios of the (known) entrance rates, analogously as described above for coarse event differentiation.

If the event is an arrival associated with a guaranteed traffic class, a determination can be made whether call blocking is implemented (either broadly speaking, or with respect to the particular arrival identified). Blocking can entail effectively discarding/ignoring/dropping the arrival if it meets one of a set of blocking criteria (e.g., if the current total voice and video occupancy in the system exceeds an allowed threshold, or by virtue of a junk/spam filter that blocks incoming arrivals from particular phone numbers or UEs). If the incoming arrival is blocked, another sojourn time interval can be computed (as a feedback loop) and the process can repeat. Otherwise (if not blocked) the arrival is accepted, the state vector ($n_{k,u}$, k=0,1) can be incremented in accordance with the guaranteed traffic class arrival, thereby increasing the resource/capacity utilization for guaranteed traffic and effectively decreasing the resources/capacity available for elastic data. Fine grain identification of a specific guaranteed class among k=0,1, is carried out based on the pseudo-random coin toss logic driven by ratios of exit rates. Next, fine grain identification of a specific SINR bin u is carried out via pseudo-random coin toss logic driven by the known probabilities of a transaction falling in various SINR bins (i.e., $\{P_{k,u}\}$). The aforementioned logic is analogously applicable to the description set forth below as well. To enable computation of the next sojourn time $\tau$, the departure rate from the current state is updated by adding the inverse of the call holding time. Furthermore, the spectrum budget available to data BD is decreased by $b_k/\theta_{.,u}$ where $b_k$ denotes the payload bandwidth occupied by the arriving guaranteed transaction (of priority class k=0,1) and $\theta_{.,u}$ denotes the spectral efficiency achieved in the SINR bin u for the cell in consideration, where the arrival landed.

Alternatively, if the event is an arrival associated with an elastic data traffic class, the state occupancy ($n_{k,u}$, k=2, . . . , 5) can be incremented in accordance with the elastic data traffic class arrival. UE throughputs as well as exit rates for all data states (e.g., $\{(k, u), k=2, . . . ,5\}$ can be updated concurrently, since (unlike in the case of guaranteed transactions), they are interrelated for elastic data transactions.

Alternatively, if the event is a departure associated with a guaranteed traffic class, the state occupancy ($n_{k,u}$, k=0, 1) can be decremented in accordance with the guaranteed traffic class departure, thereby decreasing the resource/capacity utilization for guaranteed traffic and effectively increasing the resources/capacity available for elastic data. In particular, the spectrum budget available to data BD is decreased by $b_k/\theta_{.,u}$ where $b_k$ denotes the payload bandwidth occupied by the departing guaranteed transaction (of priority class k=0,1) and $\theta_{.,u}$ denotes the spectral efficiency achieved in the SINR bin u for the cell in question, where the departing transaction belonged. Also, the departure rate from this state is updated by subtracting the inverse of the call holding time.

Alternatively, if the event is a departure associated with an elastic traffic class, the state occupancy ($n_{k,u}$, k=2, ..., 5) can be decremented in accordance with the elastic data traffic class departure. UE throughputs as well as exit rates for all components of the state vector for data (e.g., $\{n_{k,u}$, k=2, ..., 5\}$ can be updated concurrently, since (unlike in the case of guaranteed transactions), they are interrelated for elastic data transactions.

It is noted that, guaranteed traffic class and elastic data traffic class session arrival or departure rates can be updated/captured, as applicable, based on the nature of the event identified. For example, for a given class of the guaranteed traffic classes, session arrival rates can be computed as the erlangs for the given class divided by the holding time for the class. For a given class of the guaranteed traffic classes, session departure rates can be computed as the number of active sessions for the given class divided by the hold time for the class. Following the arrival/departure of a guaranteed class transaction, the spectrum share available for elastic data, BD, can be decreased/increased by an amount equal to the bandwidth occupancy of the transaction divided by the spectrum efficiency enjoyed by the transaction. For a given class of the elastic data traffic classes, session arrival rates can be computed as the respective volume of data per unit time (as measured in Megabits per second [Mbps]) divided by the data payload size of the session/transaction x (e.g., x=1 Mbits). Departure rates for sessions of the elastic data traffic classes can be interrelated to each other and to the number of transactions associated with the guaranteed traffic classes, and can be modeled/computed in accordance with scheduling priority rules.

To determine the update rules applicable for each elastic data class state (k, u), with, k=2, ..., 5 being the traffic class and u being the SINR bin, the procedure can be as follows. Per the weighted proportionate-fairness scheduling policy assumed to be in place within the cell schedulers, the current spectrum share of each active transaction in this state can be given by $s_k = BD \times w_k / (\Sigma_l \Sigma_m w_l n_{l,m})$, the summation in the denominator being across all data states (i.e., l=2, ..., 5), where BD denotes the currently available aggregate data spectrum share, $w_l$ denotes the scheduler weight assigned to elastic priority class l and $n_{l,m}$ denotes the number of currently ongoing transactions in elastic state (l, m). Next, the current user throughput enjoyed by each active transaction in state (k, u) is given by $T_{k,u} = s_k \times \theta_{,u}$ where $\theta_{,u}$ denotes the spectrum efficiency achievable in SINR bin u for the cell in question, as recorded in advance from drive test data. Finally, the departure rate from state (k, u) is given by $n_{k,u} \times T_{k,u}/x$. Note that these steps can be carried out for all states upon each arrival to/departure from any of the elastic data or guaranteed states. The procedure can be simpler when a guaranteed transaction arrival/departure occurs (only BD needs to be scaled in the above equations).

In some implementations, aggregate state exit rates can be computed to facilitate the sojourn time computation and event resolution (based on pseudo-random tosses aided by ratios of rates). For example, the (total) state exit rate can be computed as the sum of all session/transaction arrival rates and the session/transaction departure rates. The state exit rate can be used to determine the sojourn time interval ($\tau$).

According to some implementations, samples of throughput ($T_{k,u}$) can be recorded for a UE for each k and u, where applicable, with a statistical probability weighting applied thereto. In some embodiments, the probability weighting can be based on (a product of) the state vector ($n_{k,u}$) and the sojourn time interval ($\tau$).

Further, a determination can be made whether the simulation time ($sim_t$) exceeds a threshold (time_limit). If not, the sojourn time can be computed (e.g., as part of a feedback loop) and another sojourn time interval can be determined and the process can repeat. The threshold (time_limit) can be based on experimentation and can be selected to ensure accuracy/convergence is obtained, while at the same time avoiding excessive delay (e.g., delay in an amount greater than a threshold) in generating simulation outputs/results described below.

If the simulation time exceeds the threshold, the (probability weighted) recorded throughput values/samples obtained can be processed, potentially as part of generating one or more outputs (e.g., reports, displays, audio renderings/presentations, etc.). The processing can include the application of one or more filters to reduce the impact of spurious values/samples.

A blocking probability for guaranteed traffic classes can be computed and/or a tail probability for the data (e.g., the recorded throughput values, as subject to any probability weighting) can be computed. The computations can be used as part of additional/future executions (e.g., can be used as a filter or prediction of a likelihood of an event (e.g., a blocking) occurring, which can be used to modify resource allocations potentially as part of one or more weightings). The computations of the blocking probability and/or tail probability can provide an indication of a degree of confidence in the outputs of the generated output(s) of the process recorded throughput samples, which can serve as a further refinement in relation to resource allocations.

In some embodiments, the determination of the event type can adhere/conform to three hierarchical steps. In a first of the steps, a coarse resolution can be performed to identify the event as among one of: (a) an arrival, (b) a first guaranteed traffic class departure, (c) a second guaranteed traffic class departure, and (d) an elastic data traffic class departure. In a second of the steps, if the event is: an arrival (a), then a one-step array lookup can be used to resolve its QoS and SINR class (the above noted detection of the event can be replaced by an associative array lookup at fine granularity, to speed up execution); if it is a departure involving a guaranteed traffic class ((b) or (c)), then a resolution of the SINR class can be performed; if it is an elastic data traffic class departure (d), then a resolution of the QoS class can be performed. In a third of the steps, if the event is a departure involving a certain QoS class (as determined in the second step) of an elastic data traffic class (as determined in the first step), then a resolution of the SINR class can be performed.

According to aspects of the performance calculation, a QoS-based approach can be utilized as part of dimensioning/allocating resources (e.g., wireless spectrum) for a network. Such allocations can be based on a progressive search/query for the required number of cells and cell bandwidth assignments that can meet/satisfy stability and target performance criteria. In various embodiments, a sector/face load can be split among multiple cells in accordance with load-balancing policies. A scheduling policy can allocate resources in accordance with weights assigned to elastic data traffic classes.

Aspects of the performance calculation can provide analytical modeling and simulation as techniques for estimating performance in conjunction with resource allocations. Analytical modeling can enable dimensioning/allocations based on average throughput criteria. Simulation can be used to enable dimensioning/allocations based on more refined tail probability throughput criteria.

As described herein, aspects of the performance calculation provide for resource (e.g., wireless spectrum) dimensioning/allocations subject to meeting differentiated QoS targets among multiple types of traffic classes. VoIP, (conversational) video, and elastic data are examples of QoS traffic classes that can be used. Other forms/types of traffic classifications can be included/utilized in some embodiments.

Further, additional carriers/cells can be allocated within a given sector/face in response to changes (e.g., increases) in demand. Accordingly, aspects of the performance calculation can reduce (e.g., minimize) inter-sector interference by only using/allocating carriers/cells that are needed to meet QoS demands/requirements.

Aspects of the performance calculation can incorporate SINR profiles, traffic demand measurements and estimates, performance criteria, and scheduling and load balancing policies as part of generating resource (e.g., spectrum, carrier frequency, bandwidth, etc.) allocations in a network.

Figure 9:
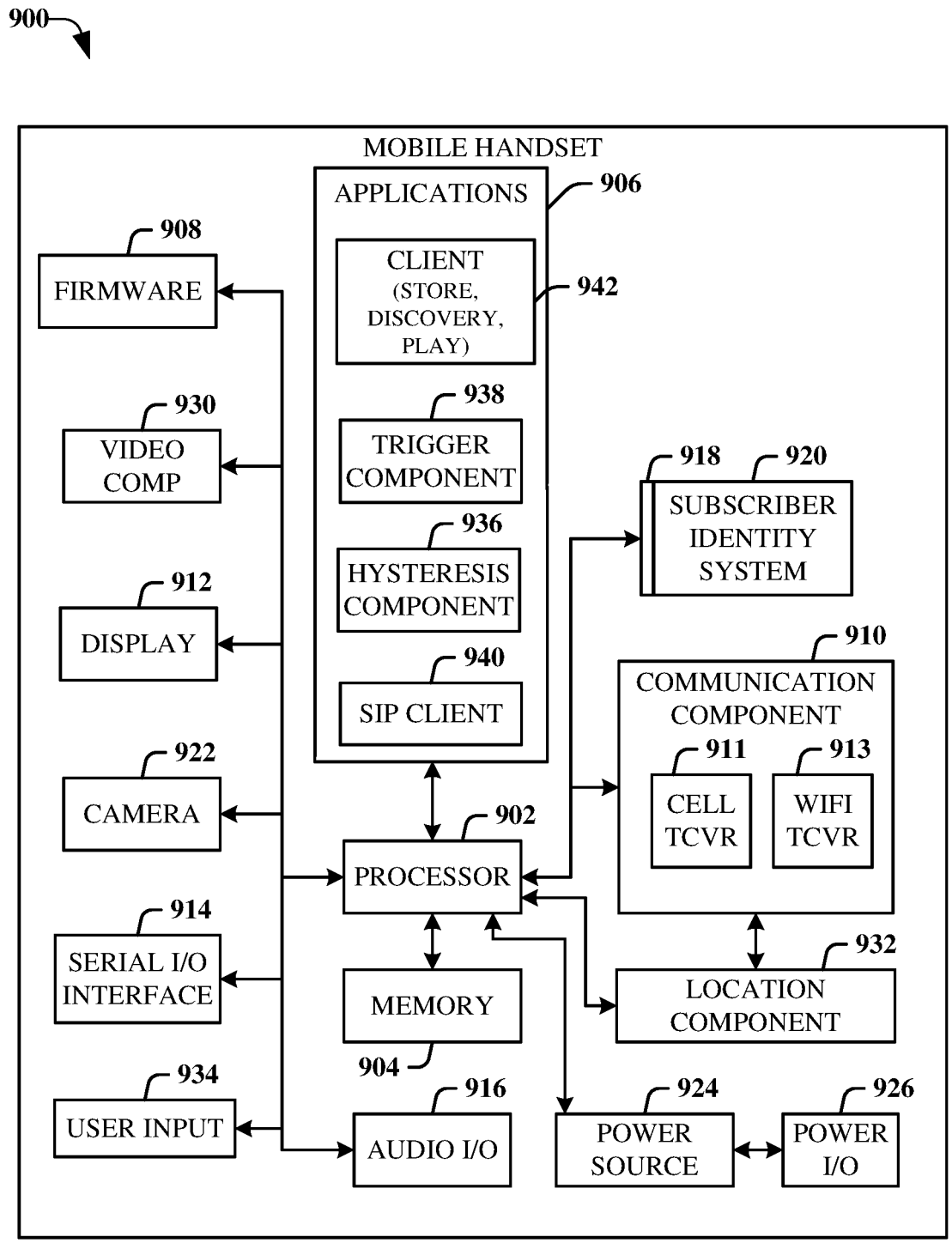
FIG. 9 illustrates an example, non-limiting, block diagram of a handset operable to engage in a system architecture that facilitates wireless communications according to one or more embodiments described herein.

Referring now to FIG. 9, illustrated is an example, non-limiting, block diagram of a handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for a dual-mode GSM handset. The handset 900 can accommodate at least satellite radio services through a handset that can combine wireless voice and digital radio chipsets into a single handheld device.

Figure 10:
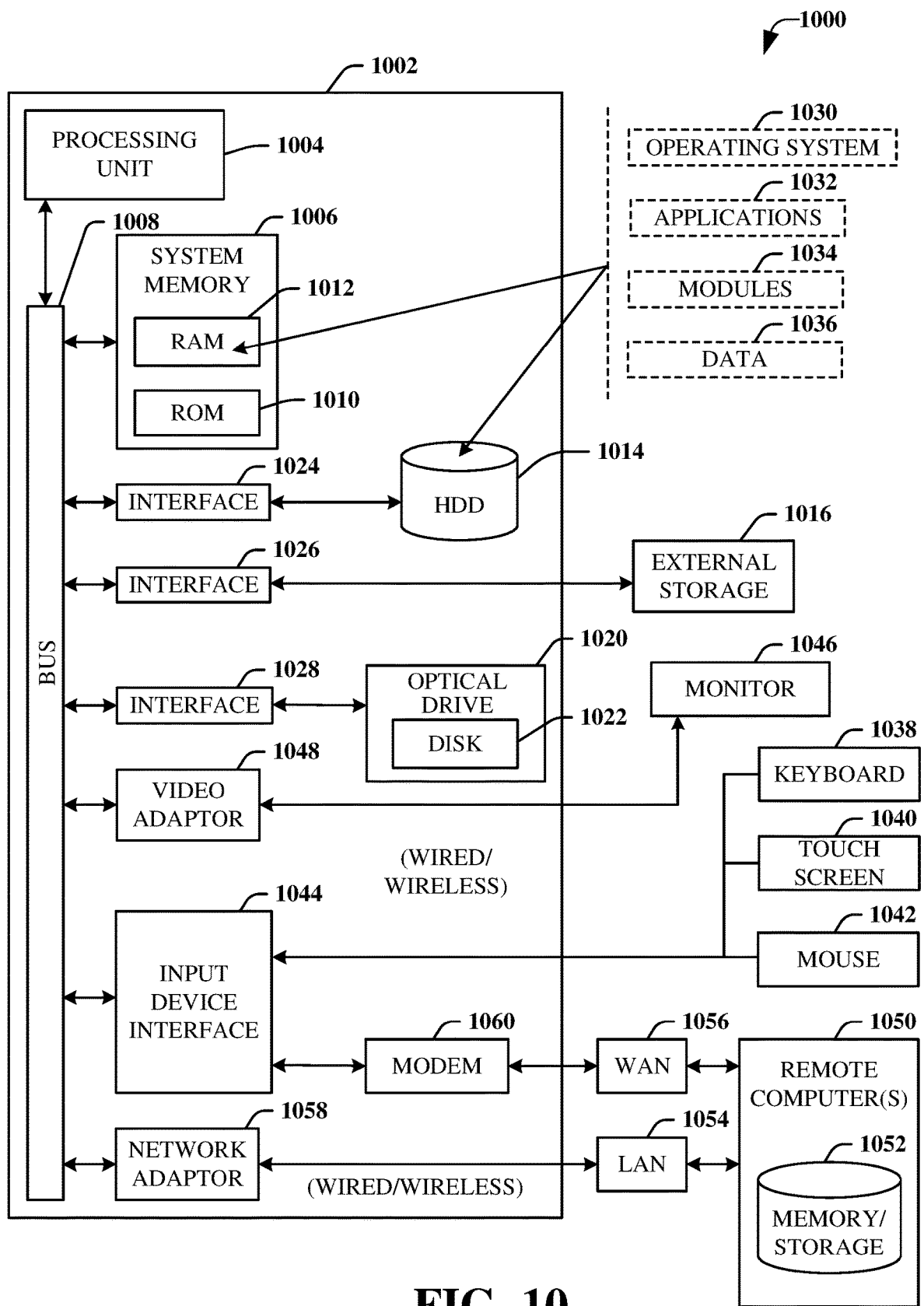
FIG. 10 illustrates an example, non-limiting, block diagram of a computer operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A Basic Input/Output System (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH@interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or can include, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device," "user equipment" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can include, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
facilitating, by a device comprising a processor, receiving first input data associated with first network equipment and second input data associated with second network equipment, wherein the first input data comprises first alternative deployment conditions and respective first criteria of the first alternative deployment conditions for the first network equipment, and wherein the second input data comprises second alternative deployment conditions and respective second criteria of the second alternative deployment conditions for the second network equipment;
determining, by the device, a first deployment condition for the first network equipment and a second deployment condition for the second network equipment, wherein the first deployment condition is selected from the first alternative deployment conditions, wherein the second deployment condition is selected from the second alternative deployment conditions, wherein a first criterion of the respective first criteria is defined for the first deployment condition and a second criterion of the respective second criteria is defined for the second deployment condition, and wherein an aggregation of the first criterion and the second criterion satisfies a function that indicates at least a defined criterion; and
facilitating, by the device, a first implementation of the first deployment condition for the first network equipment and a second implementation of the second deployment condition for the second network equipment.

2. The method of claim 1, wherein the facilitating of the first implementation of the first deployment condition comprises deploying third network equipment for use with the first network equipment.

3. The method of claim 1, wherein the facilitating of the first implementation of the first deployment condition comprises deploying small cells for use with the first network equipment.

4. The method of claim 1, wherein the facilitating of the first implementation of the first deployment condition comprises deploying carrier additions for use with the first network equipment.

5. The method of claim 1, wherein the first deployment condition comprises no changes to the first network equipment, and wherein facilitating of the first implementation of the first deployment condition comprises taking no action.

6. The method of claim 1, wherein the determining comprises modeling capacity estimates based on execution of the first alternative deployment conditions and the second alternative deployment conditions, and wherein the modeling comprises utilizing a modular approach for the modeling.

7. The method of claim 1, wherein the determining comprises modeling traffic distribution based on execution of the first alternative deployment conditions and the second alternative deployment conditions and based on detection of a change in network capacity, and wherein the modeling comprises utilizing a modular approach for the modeling.

8. The method of claim 1, wherein the determining comprises modeling user performance based on execution of the first alternative deployment conditions and the second alternative deployment conditions and based on a detection of a network traffic change.

9. The method of claim 1, wherein the determining comprises modeling based on execution of the first alternative deployment conditions and the second alternative deployment conditions and based on a change in network capacity or network traffic, and wherein the modeling comprises utilizing a modular approach and selecting the first deployment condition and the second deployment condition that are determined to retain associated costs below a threshold cost level.

10. The method of claim 1, further comprising:
prior to the determining, defining, by the device, the first alternative deployment conditions for the first network equipment and the second alternative deployment conditions for the second network equipment based on reported quality of experience of user equipment within a geographic area.

11. The method of claim 1, wherein the first input data comprises first upgrade options for the first network equipment and respective first parameters for the first upgrade options, and a defined threshold for a combination of the respective first parameters and respective second parameters of the second network equipment, and
wherein the second input data comprises second upgrade options for the second network equipment, respective second parameters for the second upgrade options, and the defined threshold.

12. The method of claim 11, wherein the respective first parameters comprise first financial data, wherein the respective second parameters comprise second financial data, and wherein the defined threshold comprises a financial budget limit.

13. A system, comprising:
a processor; and
a memory that stores executable instructions that, when executed by the processor, facilitate performance of operations, comprising:
configuring a first deployment scenario for first network equipment and a second deployment scenario for second network equipment, wherein the first deployment scenario is selected from a group of first deployment scenarios and comprises a first parameter, wherein the second deployment scenario is selected from a group of second deployment scenarios and comprises a second parameter, and wherein the configuring comprises determining that a sum of the first parameter and the second parameter satisfies a function of a defined parameter level; and
facilitating a first enactment of the first deployment scenario for the first network equipment and a second enactment of the second deployment scenario for the second network equipment.

14. The system of claim 13, wherein the facilitating of the first enactment of the first deployment scenario comprises performing an action of a group of actions, the group of actions comprising:
deploying third network equipment for use with the first network equipment,
deploying small cells for use with the first network equipment,
deploying carrier additions for use with the first network equipment, and
performing no activity with respect to the first network equipment.

15. The system of claim 13, wherein the facilitating of the second enactment of the second deployment scenario comprises performing an action of a group of actions, the group of actions comprising:

deploying third network equipment for use with the second network equipment, deploying small cells for use with the second network equipment, deploying carrier additions for use with the second network equipment, and making no changes to the second network equipment.

16. The system of claim 13, wherein the operations further comprise:

prior to the configuring, defining the group of first deployment scenarios for the first network equipment based on first reported quality of experience of first user equipment within a first geographic area of the first network equipment; and defining the group of second deployment scenarios for the second network equipment based on second reported quality of experience of second user equipment within a second geographic area of the second network equipment.

17. The system of claim 13, wherein the operations further comprise:

prior to the configuring, receiving first input data for the first network equipment and second input data for the second network equipment, wherein the first input data comprises first upgrade options for the first network equipment and respective first totals for the first upgrade options, and wherein the second input data comprises second upgrade options for the second network equipment and respective second totals for the second upgrade options.

18. A non-transitory machine-readable medium, comprising executable instructions that, when executed by a processor, facilitate performance of operations, comprising:

determining, based on first input data, a first deployment state for first network equipment and, based on second input data, a second deployment state for second network equipment, wherein the first input data comprises a first indication of a first parameter and the second input data comprises a second indication of a second parameter, and wherein the determining comprises determining that a combination of the first parameter and the second parameter does not exceed a defined parameter setting; and facilitating a first action associated with the first network equipment based on the first deployment state and a second action associated with the second network equipment based on the second deployment state.

19. The non-transitory machine-readable medium of claim 18, wherein the first action comprises an action selected from a group of actions comprising:

deploying third network equipment for use with the first network equipment, deploying small cells for use with the first network equipment, and deploying carrier additions for use with the first network equipment.

20. The non-transitory machine-readable medium of claim 18, wherein the first deployment state indicates that no changes are to be implemented at the first network equipment, and wherein the first action comprises taking no action.

* * * * *